United States Patent
Izawa et al.

(10) Patent No.: US 9,667,938 B2
(45) Date of Patent: May 30, 2017

(54) IMAGE PROCESSING DEVICE, IMAGING DEVICE, IMAGE PROCESSING METHOD, AND COMPUTER READABLE MEDIUM

(71) Applicant: FUJIFILM CORPORATION, Minato-ku, Tokyo (JP)

(72) Inventors: Katsutoshi Izawa, Saitama (JP); Takashi Aoki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 323 days.

(21) Appl. No.: 14/642,775

(22) Filed: Mar. 10, 2015

(65) Prior Publication Data

US 2015/0181194 A1 Jun. 25, 2015

Related U.S. Application Data

(63) Continuation of application No. PCT/JP2013/071181, filed on Aug. 5, 2013.

(30) Foreign Application Priority Data

Sep. 19, 2012 (JP) .................. 2012-205906

(51) Int. Cl.
*H04N 15/00* (2006.01)
*H04N 13/00* (2006.01)
(Continued)

(52) U.S. Cl.
CPC .......... *H04N 13/0011* (2013.01); *G02B 7/34* (2013.01); *G03B 13/36* (2013.01);
(Continued)

(58) Field of Classification Search
CPC ...... G02B 7/34; G03B 13/36; H04N 5/23212; H04N 13/0011; H04N 13/021; H04N 2013/0081

See application file for complete search history.

(56) References Cited

U.S. PATENT DOCUMENTS

| | | |
|---|---|---|
| 2008/0107355 A1 | 5/2008 | Onuki |
| 2009/0153693 A1 | 6/2009 | Onuki et al. |

(Continued)

FOREIGN PATENT DOCUMENTS

| | | |
|---|---|---|
| JP | 2008-116848 A | 5/2008 |
| JP | 2009-086429 A | 4/2009 |

(Continued)

*Primary Examiner* — Sath V Perungavoor
*Assistant Examiner* — Peet Dhillon
(74) *Attorney, Agent, or Firm* — SOLARIS Intellectual Property Group, PLLC

(57) ABSTRACT

There is provided an image processing device, includes: an expansion amount decision section that, for each target pixel for image processing in a first image and a second image, decides on an expansion amount of parallax according to parallax; a coefficient decision section that, for each target pixel for image processing in the first image and the second image, decides on a parallax conversion coefficient for converting the parallax into expanded parallax based on the expansion amount decided by the expansion amount decision section; an image processing section that performs processing on the target pixels to expand parallax based on the parallax conversion coefficient decided by the coefficient decision section; a generation section that generates a first display image based on an image signal, and generates a second display image for use in focus verification based on the first image and the second image.

20 Claims, 24 Drawing Sheets

(51) Int. Cl.
*G02B 7/34* (2006.01)
*G03B 13/36* (2006.01)
*H04N 5/232* (2006.01)
*H04N 13/02* (2006.01)

(52) U.S. Cl.
CPC ..... *H04N 5/23212* (2013.01); *H04N 5/23293* (2013.01); *H04N 13/021* (2013.01); *H04N 2013/0081* (2013.01)

(56) References Cited

U.S. PATENT DOCUMENTS

2012/0113314 A1    5/2012  Onuki et al.
2012/0257018 A1\*  10/2012  Shigemura ......... G02B 27/2214
                                                                  348/46

FOREIGN PATENT DOCUMENTS

JP         2009-147665 A     7/2009
JP          2009147665 A  \*  7/2009  ......... H04N 5/23212

\* cited by examiner

FILTER $F_L$ (7×7):

| 0 | 0 | 0 | 0 | 0 | 0 | 0 |
|---|---|---|---|---|---|---|
| 0 | 0 | -1 | -1 | -1 | -1 | -1 |
| 0 | 0 | -1 | -1 | -1 | -1 | -1 |
| 0 | 0 | -1 | -1 | 25 | -1 | -1 |
| 0 | 0 | -1 | -1 | -1 | -1 | -1 |
| 0 | 0 | -1 | -1 | -1 | -1 | -1 |
| 0 | 0 | 0 | 0 | 0 | 0 | 0 |

FIG.24B

FILTER $F_R$ (7×7):

| 0 | 0 | 0 | 0 | 0 | 0 | 0 |
|---|---|---|---|---|---|---|
| 0 | 0 | -1 | -1 | -1 | -1 | -1 |
| 0 | 0 | -1 | -1 | -1 | -1 | -1 |
| 0 | 0 | -1 | -1 | 25 | -1 | -1 |
| 0 | 0 | -1 | -1 | -1 | -1 | -1 |
| 0 | 0 | -1 | -1 | -1 | -1 | -1 |
| 0 | 0 | 0 | 0 | 0 | 0 | 0 |

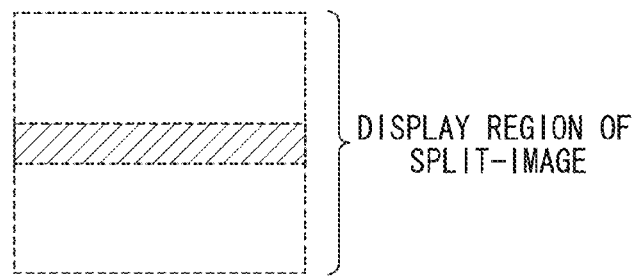
FIG.29A — DISPLAY REGION OF SPLIT-IMAGE
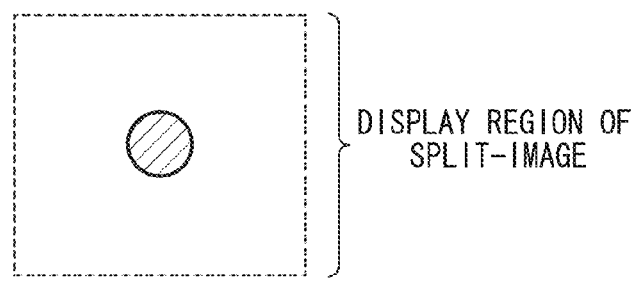
FIG.29B — DISPLAY REGION OF SPLIT-IMAGE
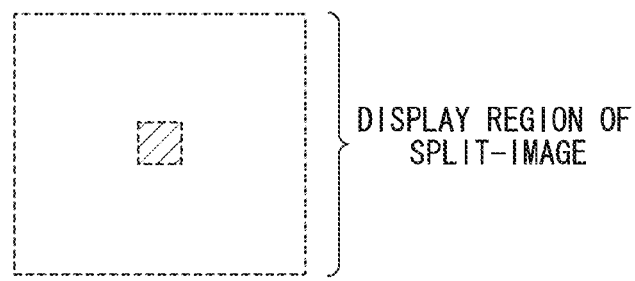
FIG.29C — DISPLAY REGION OF SPLIT-IMAGE
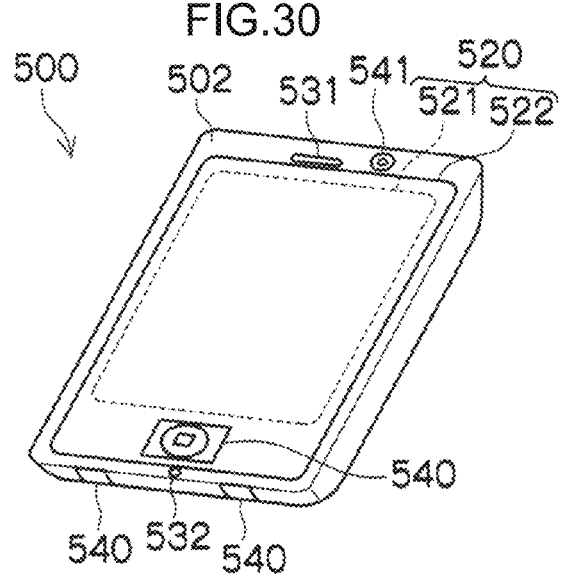
FIG.30

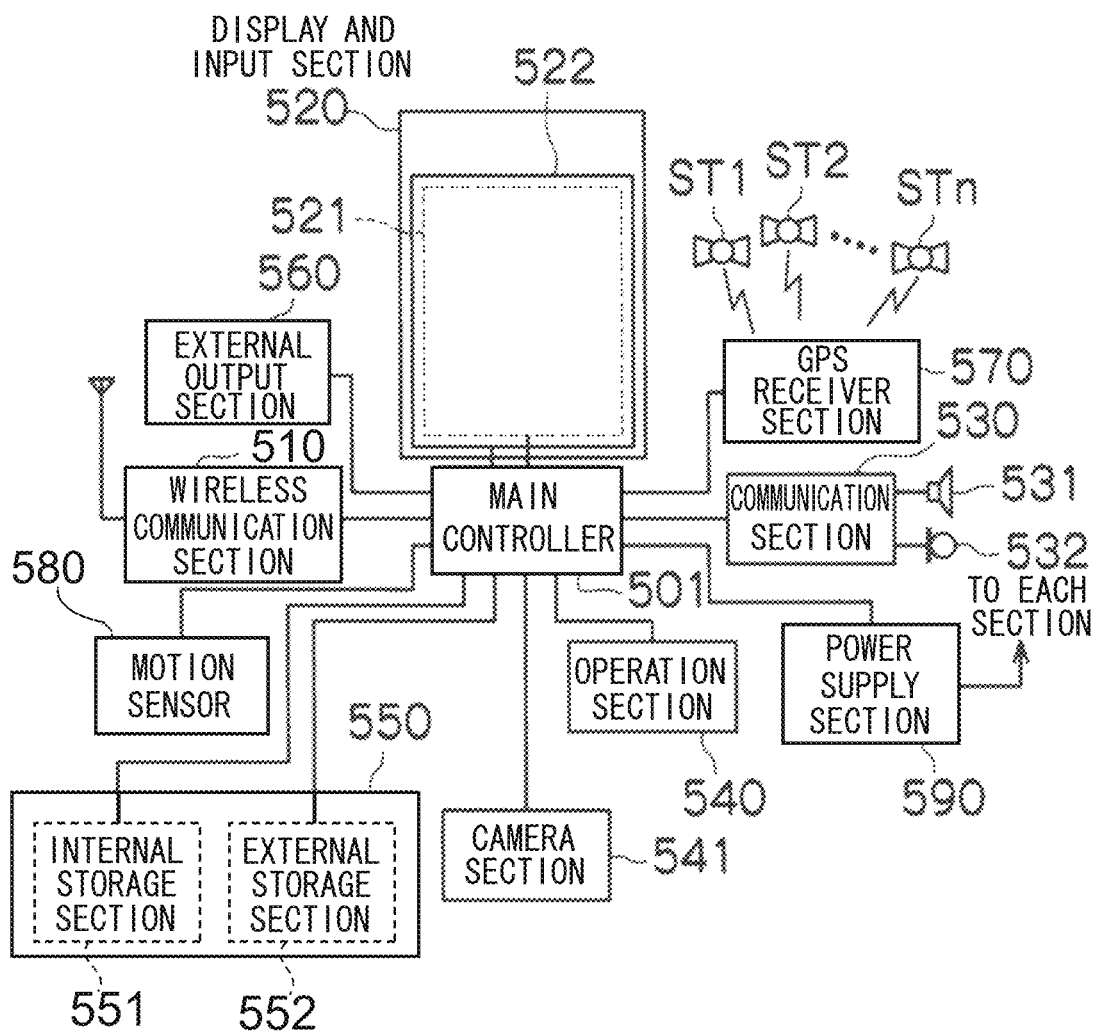

IMAGE PROCESSING DEVICE, IMAGING DEVICE, IMAGE PROCESSING METHOD, AND COMPUTER READABLE MEDIUM

CROSS-REFERENCE TO RELATED APPLICATIONS

This application is a continuation application of International Application No. PCT/JP2013/071181, filed Aug. 5, 2013, the disclosure of which is incorporated herein by reference in its entirety. Further, this application claims priority from Japanese Patent Application No. 2012-205906, filed Sep. 19, 2012, the disclosure of which is incorporated herein by reference in its entirety.

BACKGROUND

Technical Field

The present invention relates to an image processing device, an imaging device, an image processing method, and an computer readable medium.

Related Art

Digital cameras are widely known that are provided with autofocus, in which phase difference detection methods and contrast detection methods are employed, and also what is referred to as a manual focus mode, in which a user can manually perform focus adjustment.

Digital cameras including a manual focus mode are known in which a reflex mirror is provided to enable focus adjustment while checking an imaging subject, and a method is utilized in which a split microprism screen is employed to display the phase difference visually. Utilization of a method in which contrast is checked visually is also known.

However, in digital cameras with the reflex mirror omitted that have become prevalent in recent years, since there is no reflex mirror, there is no method to check the subject-image while displaying the phase difference, and contrast detection methods have had to be relied on. However, in such cases, contrast cannot be displayed at a resolution greater than that of a display device, such as a Liquid Crystal Display (LCD), requiring adoption of methods such as enlarging a portion for display.

In recent years, therefore, a split-image is displayed within a live-view image (also referred to as a through image), so as to make the work of focusing on the imaging subject easier for the user when in manual focus mode. Split-image used herein refers to a divided image that has been divided into two, for example (such as respective images divided in the up-down direction) in which displacement is imparted in a parallax generation direction (such as the left-right direction) according to focus misalignment, and is a split-image in which the displacement in the parallax generation direction disappears in an in-focus state. An operator (such as a photographer) operates a manual focus ring to focus so that the displacement in the split-image (such as respective images divided in the up-down direction) disappears.

In the imaging device described in Japanese Patent Application Laid-Open (JP-A) No. 2009-147665, out of light rays from an imaging optical system, a first subject-image and a second subject-image formed by light rays divided by a pupil divider are each photoelectrically converted to generate a first image and a second image. The first and the second images are employed to generate a split-image, and a third subject-image formed by light rays not divided by the pupil divider is photoelectrically converted to generate a third image. The third image is displayed on a display and the generated split-image is displayed inside the third image, and color data extracted from the third image is applied to the split-image. By applying color data extracted from the third image to the split-image in this way, excellent visual checkability of the split-image can be achieved.

Moreover, due to the low display resolution of an electronic viewfinder of a camera and a display (for example an LCD) provided on the back face side of a camera, it is difficult to adjust focus accurately to the perfect focus position (the position where the imaging lens is in the focused state) while viewing a split-image. There is a proposal for a method to utilize dependency of the displacement-amount in the parallax generation direction of the split-image on parallax, to assist focusing adjustment by a user by emphasizing the parallax. Such a method enables more intuitive confirmation by a user of the amount of how much deviation there is from in-focus by using the split-image.

Technical Problem

However, an issue arises that it is sometimes difficult to visually discern the displacement between images, depending on the cause of displacement occurring between images of the split image, such as the imaging capability of the imaging device, the resolution of the LCD, and the type of focus lens mounted to the camera.

SUMMARY

In consideration of the above circumstances, an object of the present invention is to provide an image processing device, an imaging device, an image processing method and an image processing program capable of improving visual checkability of displacement corresponding to parallax between images.

Solution to Problem

An image processing device according to a first aspect of the present invention includes: an image acquisition section that acquires a first image and a second image, based on a first image signal and a second image signal output respectively from a first pixel group and a second pixel group that output the first image signal and the second image signal and on which a subject image is formed after passing through a first region and a second region in an imaging lens so as to be pupil-divided; a parallax computation section that computes a parallax indicating a displacement amount between each pixel in the first image acquired by the image acquisition section and respective corresponding pixels in the second image acquired by the image acquisition section; an expansion amount decision section that, for each target pixel for image processing in the first image and second image acquired by the image acquisition section, determines an expansion amount of parallax according to the parallax computed by the parallax computation section; a coefficient decision section that, for each target pixel for image processing in the first image and the second image acquired by the image acquisition section, determines a parallax conversion coefficient for converting the parallax computed by the parallax computation section into expanded parallax based on the expansion amount decided by the expansion amount decision section; an image processing section that performs processing on the target pixels to expand parallax based on the parallax conversion coefficient determined by the coefficient decision section; a generation section that generates a first display image based on an image signal output from an image pick-up device including the first pixel group and the second pixel group, and generates a second display image for use in focus verification based on the first image and the second image; a display section that displays images; and a display controller that controls the display section so as to display the first display image, and to display in a display region of the first display image the second display image including an image in which processing to expand parallax has been performed on the target pixels. This thereby enables better visual checkability of displacement corresponding to the parallax between images than in cases without such configuration.

In a second aspect of the present invention, the first aspect of the present invention may be configured such that the expansion amount that increases as the parallax computed by the parallax computation section decreases. This thereby enables even better visual checkability of displacement corresponding to the parallax between images than in cases without such configuration.

In a third aspect of the present invention, the first aspect or the second aspect of the present invention may be configured such that the expansion amount is determined according to at least one factor for generating displacement between the first display image displayed in a specific display region and the second display image displayed in the specific display region. This thereby enables even better visual checkability of displacement corresponding to the parallax between images than in cases without such configuration.

In a fourth aspect of the present invention, the third aspect of the present invention may be configured such that the at least one factor includes a factor of an aperture number of the imaging lens, and the expansion amount increases as the aperture number gets larger. This thereby enables situations in which the displacement corresponding to the parallax between images becomes more difficult to discern visually as the aperture number gets bigger to be suppressed from occurring better than in cases without such configuration.

In a fifth aspect of the present invention, the fourth aspect of the present invention may be configured such that the expansion amount decision section determines the expansion amount based on the aperture number and a maximum aperture number. This thereby enables an appropriate expansion amount to be decided more easily than in cases without such configuration.

In a sixth aspect of the present invention, the fourth aspect of the present invention may be configured such that the aperture number is an aperture number used during video image capture or an aperture number used during still image capture. This thereby enables an appropriate expansion amount to be decided more easily than in cases without such configuration.

In a seventh aspect of the present invention, any one of the third aspect to the sixth aspect of the present invention may be configured such that the at least one factor is plural factors for defining the displacement amount between the first display image and the second display image displayed in the display region. This thereby enables, with a simple configuration, better visual checkability of displacement corresponding to parallax between images than in cases without such configuration.

In an eighth aspect of the present invention, any one of the first aspect to the seventh aspect of the present invention may be configured such that the image pick-up device includes a third pixel group that outputs a third image signal of a subject-image formed as an image without being pupil-divided, and the generation section generates the first display image based on the third image signal output from the third pixel group. This thereby enables the quality of the first display image to be improved compared to cases without such configuration.

In a ninth aspect of the present invention, any one of the first aspect to the eighth aspect of the present invention may be configured such that the target pixels are pixels corresponding to pixels included in a particular section image in the second display image. This thereby enables the load for image processing to be reduced compared to cases without such configuration.

In a tenth aspect of the present invention, the ninth aspect of the present invention may be configured further including a designation section that designates a section region on a display screen of the display device, wherein the particular section image is an image at a position in the second display image corresponding to a position of the section region designated by the designation section. This thereby enables easier designation of the target pixels for image processing compared to cases without such configuration.

In an eleventh aspect of the present invention, the tenth aspect of the present invention may be configured such that the particular section image is part of a split-image corresponding to an image in which the first display image and the second display image are displaced along a parallax generation direction by a displacement amount according to parallax. This thereby enables the displacement in the split-image corresponding to the parallax between images to be visually discerned more easily than in cases without such configuration.

In a twelfth aspect of the present invention, the tenth aspect or the eleventh aspect of the present invention may be configured such that the particular section image is an image applied with coloration having color characteristics different from other regions of a split-image. This thereby enables the image in the split-image that has been image processed based on the parallax conversion coefficient to be more easily identified visually from the other image therein than in cases without such configuration.

In a thirteenth aspect of the present invention, any one of the first aspect to the twelfth aspect of the present invention may be configured to further include a determination section that determines whether or not the target pixel is outside a specific parallax range satisfying a specific condition, wherein the expansion amount decision section decides the expansion amount for each of the target pixels determined by the determination section to be outside the specific parallax range. This thereby enables better suppression of deciding on an expansion amount for pixels on which image processing does not need to be performed than in cases without such configuration.

In a fourteenth aspect of the present invention, any one of the first aspect to the thirteenth aspect of the present invention may be configured such that the parallax conversion coefficient is a filter coefficient determined according to the expansion amount decision section, and the image processing section performs processing to expand parallax by performing filter processing on the target pixels with a filter using the filter coefficient. This thereby enables image processing based on the parallax conversion coefficient to be performed on the target pixels with a simple configuration compared to cases without such configuration.

An imaging device of a fifteenth aspect of the present invention includes the image processing device of any one of the first aspect to the fourteenth aspect of the present invention, and a storage section that stores images obtained by the image processing section performing the processing to expand parallax. This thereby enables even better visual checkability of displacement corresponding to the parallax between images than in cases without such configuration.

In a sixteenth aspect of the present invention, the fifteenth aspect of the present invention may be configured to further include an electronic viewfinder that displays images obtained by the image processing section performing processing to expand parallax; and a detection section that detects use of the electronic viewfinder, wherein the expansion amount decision section selects an in-use expansion amount predetermined as the expansion amount to be employed during use of the electronic viewfinder in cases in which use of the electronic viewfinder has been detected by the detection section, and selects a non-use expansion amount predetermined as the expansion amount to be employed during non-use of the electronic viewfinder in cases in which use of the electronic viewfinder has not been detected by the detection section. This thereby enables more appropriate expansion amounts to be decided on for when the electronic viewfinder is in-use and not in use than in cases without such configuration.

In a seventeenth aspect of the present invention, the sixteenth aspect of the present invention may be configured such that in cases in which use of the electronic viewfinder is not detected by the detection section and an image on which parallax expansion processing has been performed by the image processing section is to be displayed on an image display section with a number of pixels in a parallax generation direction different from the number of pixels in the parallax generation direction of the electronic viewfinder, the non-use expansion amount is set to a display section in-use expansion amount predetermined as the expansion amount to be employed during use of the image display section. This thereby enables a more appropriate expansion amount to be decided on in cases in which an image that has completed image processing is to be displayed on the display section of pixel number in the parallax generation direction different to that of the electronic viewfinder than in cases without such configuration.

In an eighteenth aspect of the present invention, the seventeenth aspect of the present invention may be configured such that the number of pixels in the parallax generation direction of the image display section is more than the number of pixels in the parallax generation direction of the electronic viewfinder, and the in-use expansion amount is set as a value larger than the display section in-use expansion amount in cases in which use of the electronic viewfinder is detected by the detection section. This thereby enables better visual checkability of displacement in the split-image corresponding to the parallax between images in cases in which an image that has completed image processing is to be displayed on the electronic viewfinder than in cases without such configuration.

An image processing method according to a nineteenth aspect of the present invention includes: an image acquisition process that acquires a first image and a second image, based on a first image signal and a second image signal output respectively from a first pixel group and a second pixel group that output the first image signal and the second image signal and on which a subject image is formed after passing through a first region and a second region in an imaging lens so as to be pupil-divided; a parallax computation process that computes a parallax indicating a displacement amount between each pixel in the first image acquired by the image acquisition process and respective corresponding pixels in the second image acquired by the image acquisition process; an expansion amount decision process that, for each target pixel for image processing in the first image and the second image acquired by the image acquisition process, determines an expansion amount of parallax according to the parallax computed by the parallax computation process; a coefficient decision process that, for each target pixel for image processing in the first image and the second image acquired by the image acquisition process, determines a parallax conversion coefficient for converting the parallax computed by the parallax computation process into expanded parallax based on the expansion amount decided by the expansion amount decision process; an image processing process that performs processing on the target pixels to expand parallax based on the parallax conversion coefficient determined by the coefficient decision process; a generation process that generates a first display image based on the image signal output from an image pick-up device including the first pixel group and the second pixel group, and generates a second display image for use in focus verification based on the first image and the second image; and a display control process that controls so as to display the first display image on a display section that displays images, and to display, in a display region of the first display image, the second display image including an image in which processing to expand parallax has been performed on the target pixels. This thereby enables better visual checkability of displacement corresponding to the parallax between images than in cases without such configuration.

In order to achieve the above objective, a non-transitory computer-readable storage medium storing a program for causing a computer to function as: the image acquisition section, the parallax computation section, the expansion amount decision section, the coefficient decision section, the image processing section, the generation section, and the display controller of the image processing device in any one of the first aspect to the sixteenth aspect of the present invention. This thereby enables better visual checkability of displacement corresponding to the parallax between images than in cases without such configuration.

The present invention obtains the advantageous effect of enabling good visual checkability of displacement corresponding to the parallax between images.

BRIEF DESCRIPTION OF DRAWINGS

FIG. 5 is a diagram to explain the principle of a basic array pattern.

FIG. 7 is a schematic layout diagram illustrating an example of placement of light-blocking members provided to an image pick-up device included in an imaging device according to the first exemplary embodiment.

FIG. 24A is a schematic diagram illustrating an example of a two dimensional filter for left eye image use according to the first exemplary embodiment.

FIG. 24B is a schematic diagram illustrating an example of a two dimensional filter for right eye image use according to the first exemplary embodiment.

FIG. 29A is a schematic diagram illustrating an example of a first section display region shorter in the top-bottom direction than the first section display region illustrated in FIG. 18.

FIG. 29B is a schematic diagram illustrating an example of a first section display region configured as a circular shaped region.

FIG. 29C is a schematic diagram illustrating an example of a first section display region configured as a square shaped region.

FIG. 30 is a perspective view illustrating an example of the external appearance of a smartphone according to a second exemplary embodiment.

FIG. 31 is a block diagram illustrating an example of relevant configuration of an electrical system of a smartphone according to the second exemplary embodiment.

DESCRIPTION OF EMBODIMENTS

Explanation follows regarding an example of an exemplary embodiment of an imaging device according to the present invention, with reference to the drawings.

First Exemplary Embodiment

Figure 1:
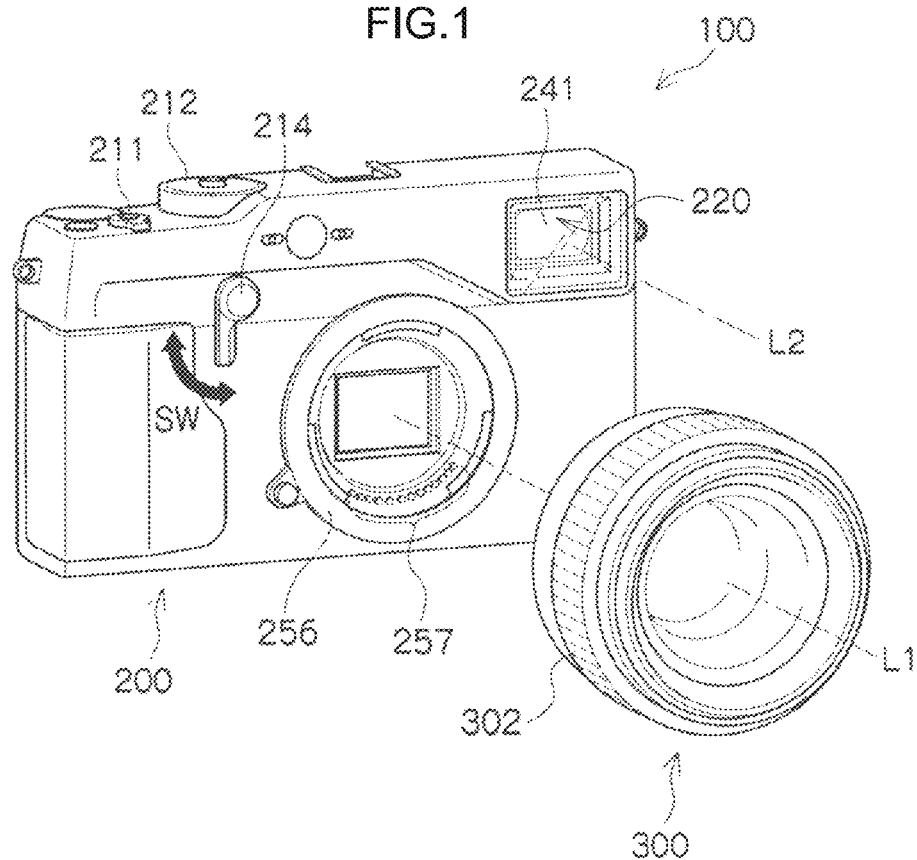
FIG. 1 is a perspective view illustrating an example of an external appearance of an imaging device that is an interchangeable lens camera according to a first exemplary embodiment.
Figure 2:
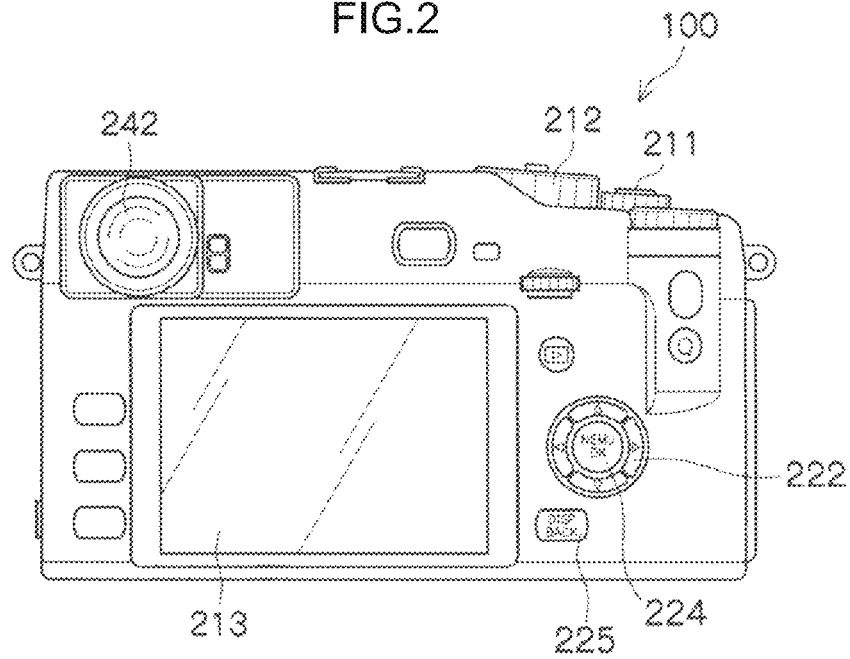
FIG. 2 is a back view illustrating the back face side of the imaging device illustrated in FIG. 1.

FIG. 1 is a perspective view illustrating an example of an external appearance of an imaging device 100 according to a first exemplary embodiment. FIG. 2 is a back view of the imaging device 100 illustrated in FIG. 1.

The imaging device 100 is an interchangeable lens camera, and is a digital camera with a camera body 200 and an interchangeable lens 300 (imaging lens and focusing lens 302 (manual operation section)) that is interchangeably mounted to the camera body 200, and without a reflex mirror. A HYBRID FINDER (registered trademark) 220 is also provided to the camera body 200. HYBRID FINDER 220 indicates, for example, a finder capable of selective operation as an optical viewfinder (referred to as "OVF" below), or as an electronic viewfinder (referred to as "EVF" below).

The camera body 200 and the interchangeable lens 300 are mounted interchangeably by coupling a mount 256 provided to the camera body 200 together with a mount 346 (see FIG. 3) provided on the interchangeable lens 300 side to correspond to the mount 256.

An OVF finder window 241 included in the HYBRID FINDER 220 is provided on the front face of the camera body 200. A finder switching lever (finder switching section) 214 is provided on the front face of the camera body 200. An optical image visible with the OVF and an electronic image (live-view image) visible with the EVF are selectively displayed (described later) by turning the finder switching lever 214 in the directions of the arrows SW. The optical axis L2 of the OVF is different to the optical axis L1 of the interchangeable lens 300. The top face of the camera body 200 is mainly provided with a release button 211 and a dial 212 to set imaging mode, replay mode, and the like.

The back face of the camera body 200 is provided with an OVF finder eyepiece 242, a display section 213, a cross-key 222, a MENU/OK key 224, and a BACK/DISP button 225.

The cross-key 222 functions as a multifunction key to output various instruction signals, such as to select a menu, zoom, and to advance frames. The MENU/OK key 224 is an operation key that functions as a menu button to instruct display of a menu on the screen of the display section 213, and also doubles as an OK button function to confirm selected content, to instruct execution, or the like. The BACK/DISP button 225 is used to erase display content, such as a selected item, cancel designation content, or return to the one-previous operation state.

The display section 213 is implemented for example by an LCD, and is employed to display a live-view image (through image) that is an example of successive frame images obtained by imaging successive frames during an imaging mode. The display section 213 is also employed to display a still image that is an example of a single frame image obtained by imaging a single frame in cases in which an instruction to capture a still image has been given. Moreover, the display section 213 is also employed to display a reproduced image in a reproduction mode, and to display menu screens and the like.

Figure 3:
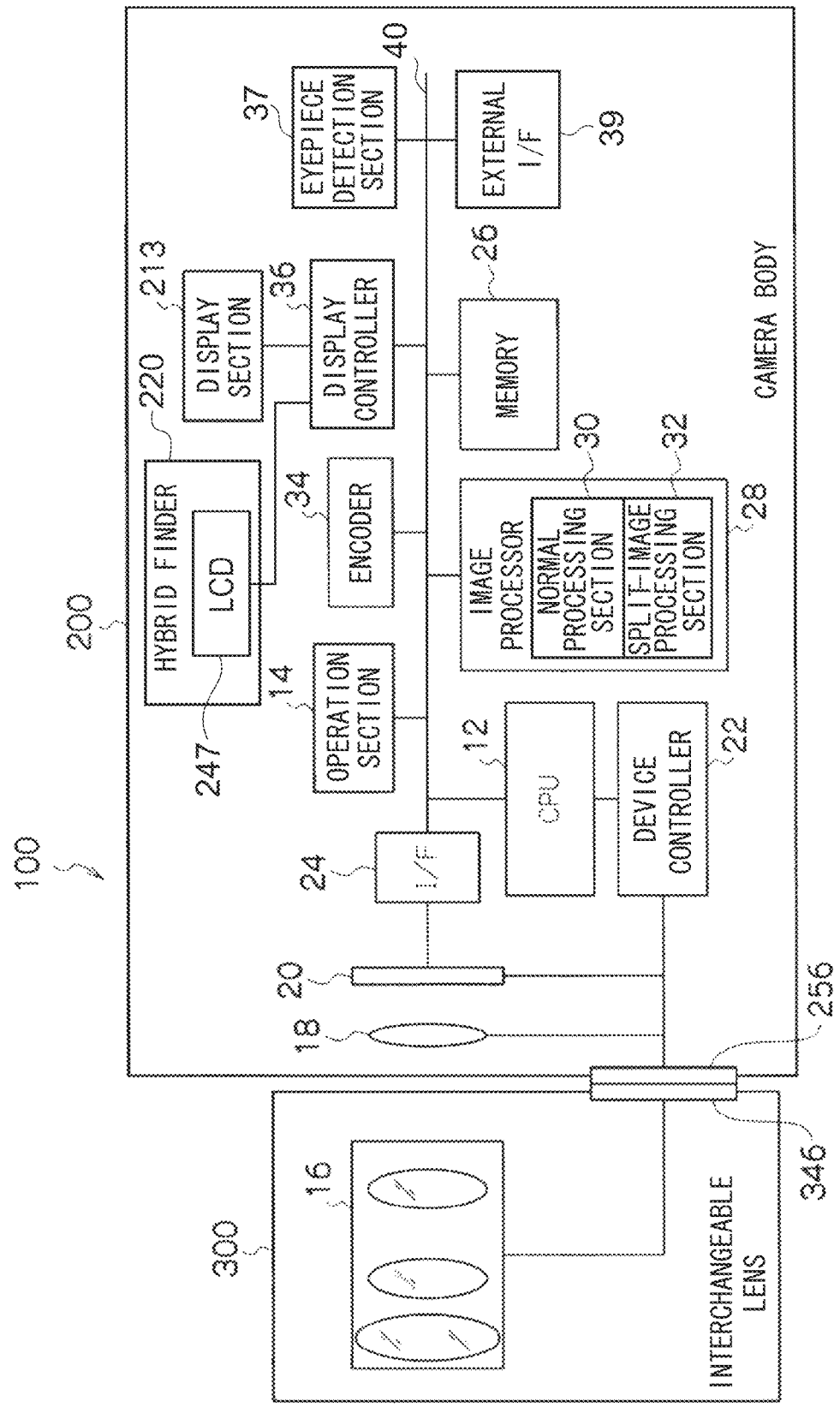
FIG. 3 is a block diagram illustrating an example of a configuration of an electrical system of an imaging device according to the first exemplary embodiment.

FIG. 3 is a block diagram illustrating an example of a configuration (internal configuration) of an electrical system of the imaging device 100 according to the first exemplary embodiment.

The imaging device 100 is a digital camera that records captured still images and video images, and the overall operation of the camera is integrally controlled by a Central Processing Unit (CPU) 12. In addition to the CPU 12, the imaging device 100 also includes an operation section 14 that is an example of a designation section, an interface section 24, a memory 26, an encoder 34, a display controller 36, and an eyepiece detection section 37 that is an example of a detection section according to the present invention. The imaging device 100 further includes an image processor 28 that is an example of an image acquisition section, a parallax computation section, an expansion amount decision section, a coefficient decision section, an image processing section, and a determination section of the present invention. The CPU 12, the operation section 14, the interface section 24, the memory 26, the image processor 28, the encoder 34, the display controller 36, the eyepiece detection section 37, and an external interface (I/F) 39 are connected to each other through a bus 40.

The operation section 14 includes the release button 211, the dial (focus mode switching section) 212 to select the imaging mode and the like, the display section 213, the finder switching lever 214, the cross-key 222, the MENU/OK key 224, and the BACK/DISP button 225. The operation section 14 also includes a touch panel to receive various data. The touch panel, for example, overlays the display screen of the display section 213. Various operation signals output from the operation section 14 are input to the CPU 12.

When the imaging mode has been set, image light representing an imaging subject is formed as an image on a light receiving face of a color image pick-up device (for example a CMOS sensor) 20 through imaging lenses 16 that include a focus lens that is movable by manual operation and a shutter 18. Signal charges accumulated in the image pick-up device 20 are read in sequence as digital signals according to the signal charges (voltage) by a read signal input from a device controller 22. The image pick-up device 20 has what is referred to as an electronic shutter function, and the charge accumulation time (shutter speed) of each photosensor is controlled by the timing of the read signals by operating the electronic shutter function. The image pick-up device 20 according to the first exemplary embodiment is a Complementary Metal Oxide Semiconductor (CMOS) image sensor, however there is no limitation thereto, and a Charge-Coupled Device (CCD) image sensor may be employed.

Figure 4:
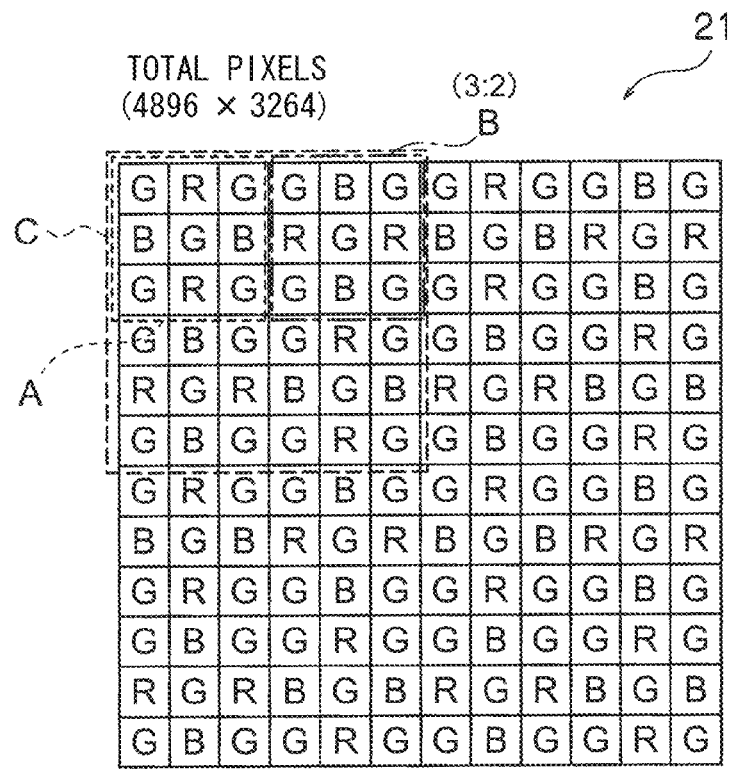
FIG. 4 is a schematic layout diagram illustrating an example of an array of a color filter provided to an image pick-up device included in an imaging device according to the first exemplary embodiment.

FIG. 4 schematically illustrates an example of an array of a color filter 21 provided to the image pick-up device 20. In the example illustrated in FIG. 4, (4896×3264) pixels are employed as an example of the number of pixels, and 3:2 is applied as the aspect ratio; however, the number of pixels and the aspect ratio are not limited thereto. As in the example of FIG. 4, the color filter 21 includes a first filter G corresponding to green (G) that contributes most to obtaining a brightness signal, a second filter R corresponding to red (R), and a third filter B corresponding to blue (B). The array pattern of the first filter G (referred to below as G filter), the second filter R (referred to below as R filter), and the third filter B (referred to below as B filter) is classified into a first array pattern A and a second array pattern B.

In the first array pattern A, the G filter is placed on the 4 corner pixels and center pixel of a 3×3 pixel square array. In the first array pattern A, the R filter is placed in the vertical line at the horizontal direction center of the square array. In the first array pattern A the B filter is placed in the horizontal line at the vertical direction center of the square array. In the second array pattern B, the placement of the filter G is the same as that of the first basic array pattern A, and the placement of the filter R and the placement of the B filter are in a swapped over pattern thereto. The color filter 21 includes a basic array pattern C formed from a square array pattern corresponding to 6×6 pixels. The basic array pattern C is a 6×6 pixel pattern disposed with the first array pattern A and the second array pattern B so as to have point symmetry, with the basic array pattern C disposed repeating in both the horizontal direction and the vertical direction. Namely, in the color filter 21 each of the color filters R, G, B (the R filter, G filter, B filter) is arrayed with a specific periodicity. This thereby enables processing to be performed according to a repeating pattern during performing synchronization (interpolation) processing and the like on the R, G, B signals read from the color image pick-up device.

Moreover, when images are reduced by thinning processing in basic array pattern C units, the color filter array of the thinning processed reduced image can be made similar to the color filter array prior to thinning processing, enabling a common processing circuit to be employed.

The color filter 21 has the G filter corresponding to the color contributing the most to obtaining a brightness signal (the color G in the first exemplary embodiment), placed in each line in the horizontal direction, vertical direction and diagonal directions of the color filter array. This thereby enables the reproduction precision of synchronization processing to be raised in high frequency regions, irrespective of the high frequency direction.

In the color filter 21, the R filter and the B filter corresponding to two or more other colors other than the G color (the R and B colors in the first exemplary embodiment) are placed in each line in the horizontal direction and vertical direction of the color filter array. This thereby enables color moiré (false color) generation to be suppressed, thereby enabling an optical low pass filter for suppressing false color generation to be omitted from placement on the optical path of the optical system from the incident face to the imaging plane. Moreover, even in cases in which an optical low pass filter is employed, one can be employed that has a weak action to cut the high frequency components to prevent false color generation, enabling deterioration of resolution to be avoided.

The basic array pattern C can be considered as an array of alternate first array pattern A and second array pattern B in the horizontal direction and vertical direction, wherein the first array pattern A is the 3×3 pixels surrounded by the frame of the broken line, and the second array pattern B is the 3×3 pixels surrounded by the frame of the single dot intermittent line.

The first array pattern A and the second array pattern B both have the G filters that are the respective brightness system pixels placed at their 4 corners and center, so as to be placed along their two diagonals. Moreover, in the first array pattern A, the B filters are arrayed in the horizontal direction on each side of the central G filter, and the R filters are arrayed in the vertical direction on each side of the central G filter. However, in the second array pattern B, the R filters are arrayed on each side of the central G filter in the horizontal direction, and the B filters are arrayed in the vertical direction on each side of the central G filter. Namely, the first array pattern A and the second array pattern B have reverse positional relationships to each other for the R filters and the B filters, but have the same placement otherwise.

Figure 5:
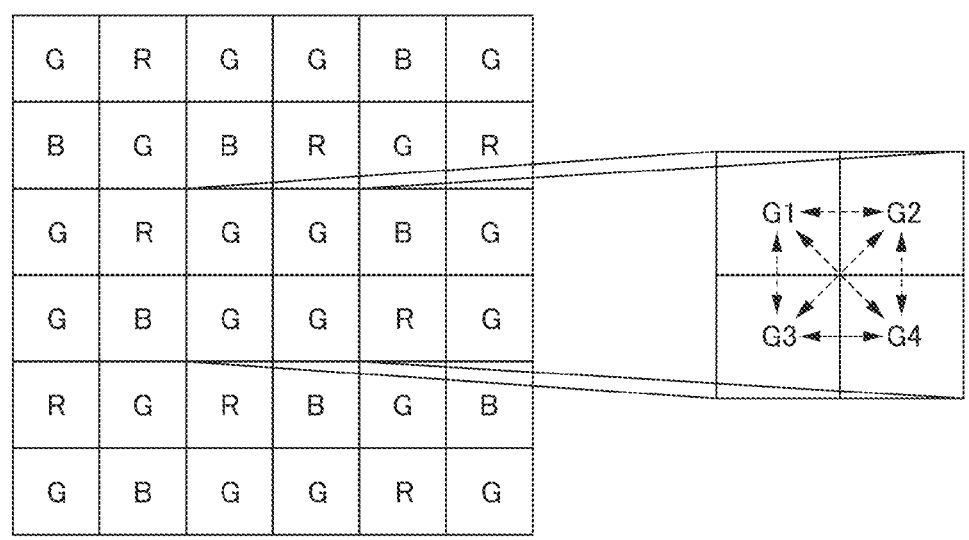
FIG. 5 is a diagram to accompany explanation of a method to determine correlation direction from pixel values of 2×2 G pixels included in the color filter illustrated in FIG. 4.

Moreover, the G filters at the 4 corners of the first array pattern A and the second array pattern B configure G filters that are arrayed in a square array corresponding to 2×2 pixels by disposing the first array pattern A and the second array pattern B alternately along the horizontal and vertical directions as illustrated in the example in FIG. 5. By extracting the 2×2 pixels formed from the G filters as illustrated in the example in FIG. 5, the difference in absolute value of the pixel values of the G pixels in the horizontal direction, the difference in absolute value of the pixel values of the G pixels in the vertical direction, and the difference in absolute value of the pixel values of the G pixels in the diagonal directions (sloping up to the right and sloping up to the left) are computed. This thereby enables determination that there is correlation in the direction with the smallest difference in absolute value out of the horizontal direction, vertical direction and diagonal directions. Namely, the direction with the highest correlation out of the horizontal direction, vertical direction, and diagonal directions is determined by employing the data of the G pixels with the smallest pixel separation. This determination result can then be employed in interpolation processing from the peripheral pixels (synchronization processing).

The placement in the basic array pattern C of the color filter 21 has point symmetry about the center of the basic array pattern C (the center of the 4 G filters). Moreover, the first array pattern A and the second array pattern B inside the basic array pattern C also each have respective point symmetry about the G filters at their respective centers, enabling the circuit scale of a later stage processing circuit to be made smaller or simplified, for example.

Figure 6:
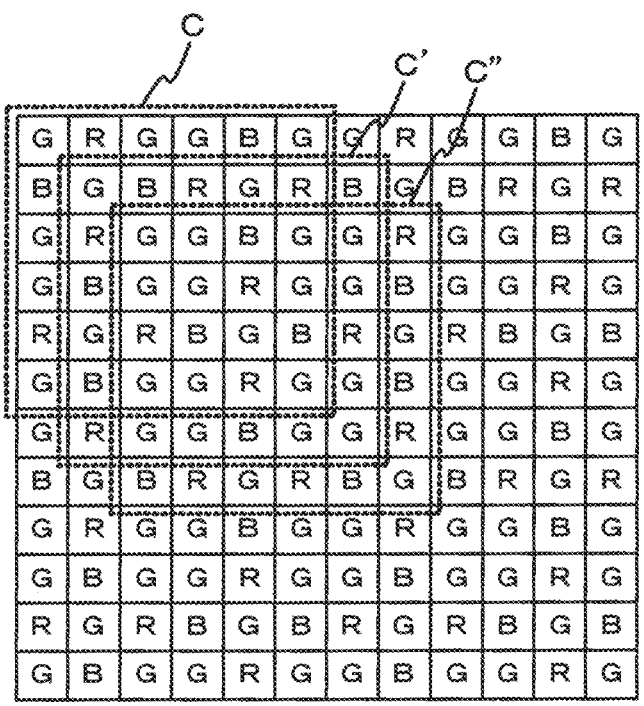
FIG. 6 is a diagram to explain the principle of a basic array pattern included in the color filter illustrated in FIG. 4.

In the basic array pattern C illustrated as an example in FIG. 6, the color filter arrays of the first and third lines out of the first to sixth horizontal direction lines are GRGGBG. The color filter array of the second line is BGBRGR. The color filter arrays of the fourth and sixth lines are GBGGRG. The color filter array of the fifth line is RGRBGB. In the example illustrated in FIG. 6, basic array patterns C, C', C" are illustrated. The basic array pattern C' represents a shifted pattern of the basic array pattern C shifted respectively by 1 pixel each in the horizontal direction and vertical direction. The basic array pattern C" represents a shifted pattern of the basic array pattern C shifted respectively by 2 pixels each in the horizontal direction and vertical direction. Thus in the color filter 21, the same color filter array results even if it is the basic array patterns C', C" that are repeatedly disposed along the horizontal direction and vertical direction. In the first exemplary embodiment, the basic array pattern C is, for convenience, referred to as the basic array pattern.

Figure 7:
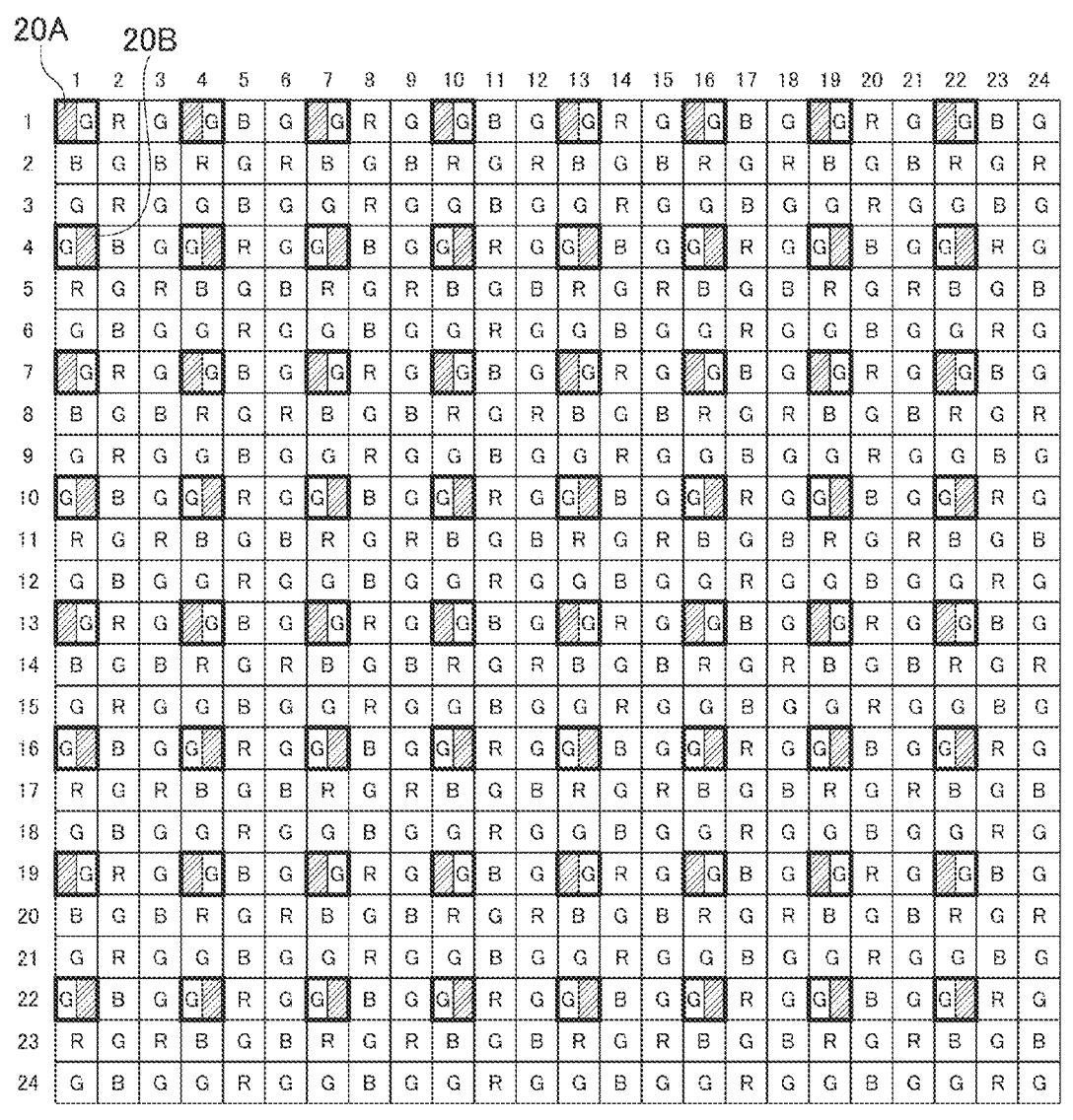

The imaging device 100 includes a phase difference AF function. The image pick-up device 20 includes plural phase difference detection pixels employed to operate the phase difference AF function. The plural phase difference detection pixels are arrayed in a predetermined pattern. Light-blocking members 20A that block light to the horizontal direction left half of a pixel, and light-blocking members 20B that block light to the horizontal direction right half of a pixel, are provided on the phase difference detection pixels, as illustrated in the example of FIG. 7. In the first exemplary embodiment, for ease of explanation, the phase difference detection pixels provided with the light-blocking members 20A are referred to as "first pixels", and the phase difference pixels provided with the light-blocking members 20B are referred to as "second pixels". They are referred to as "phase difference pixels" when there is no need in the explanation to discriminate between the first pixels and the second pixels.

Figure 8:
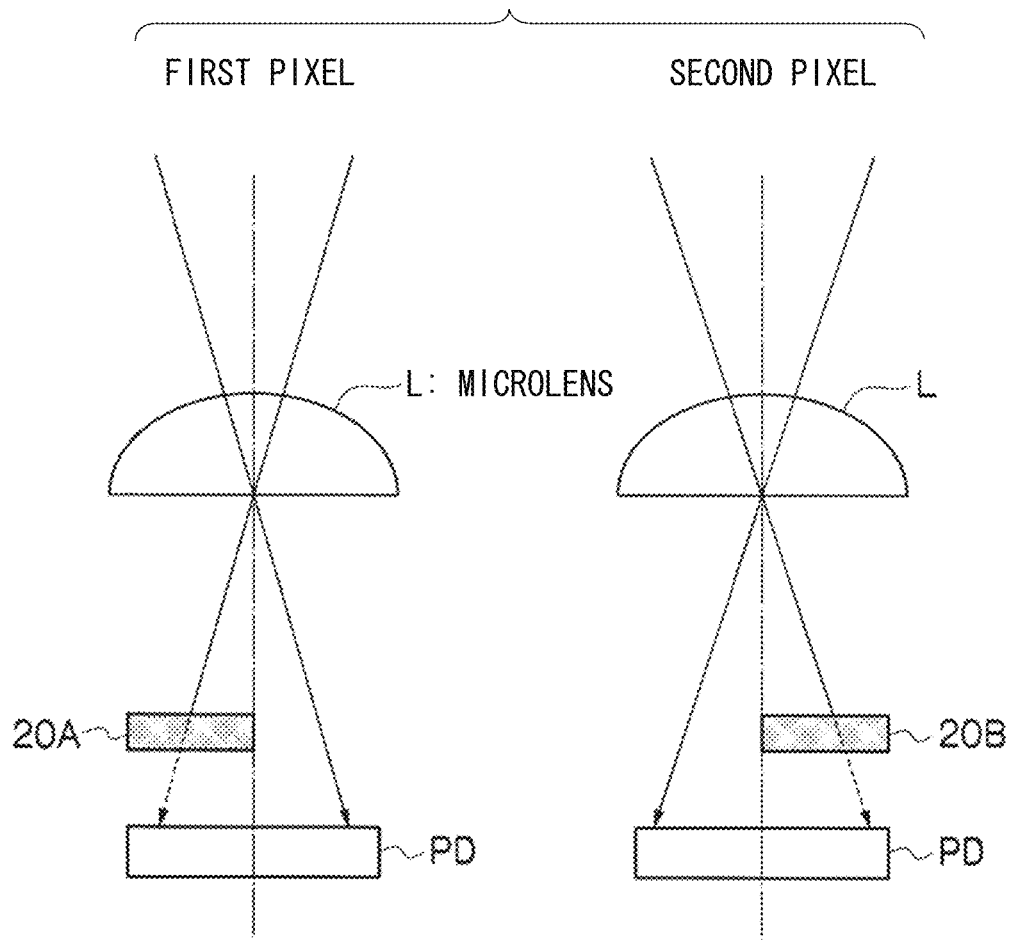
FIG. 8 is a schematic configuration diagram illustrating an example of a configuration of phase difference pixels (a first pixel and a second pixel) included in an image pick-up device of an imaging device according to the first exemplary embodiment.

An example of the first pixels and the second pixels placed in the image pick-up device 20 is illustrated in FIG. 8. The first pixels illustrated in FIG. 8 include the light-blocking members 20A, and the second pixels therein include the light-blocking members 20B. The light-blocking members 20A are provided at the front face side of a photodiode PD (microlens L side), and block light to the left half of the light receiving faces. The light-blocking members 20B are provided at the front face side of a photodiode PD, and block light to the right half of the light receiving faces.

The microlens L and the light-blocking members 20A, 20B function as a pupil divider, and the first pixels receive light only from light rays passing through an exit pupil of imaging lenses 16 on the left side of the optical axis, and the second pixels receive light only from light rays passing through the exit pupil of the imaging lenses 16 on the right side of the optical axis. Thus the light rays passing through the exit pupil are divided to the left and right by the microlens L and the light-blocking members 20A, 20B serving as a pupil divider, and are respectively incident to the first pixels and the second pixels.

Portions in-focus (in a focused state) out of the subject-image corresponding to the light rays of the left half and the subject-image corresponding to the light rays on the right half among the light rays passing through the exit pupil of the imaging lenses 16 are focused at the same position on the image pick-up device 20. Conversely, portions in front of focus or behind focus are incident to different respective positions on the image pick-up device 20 to each other (phase shifted). This thereby enables a parallax image (left eye image, right eye image) to be acquired with different parallax for the subject-image corresponding to the light rays of the left half, and the subject-image corresponding to the light rays of the right half.

The imaging device 100 detects a phase shift amount based on pixel values of the first pixels and pixel values of the second pixels by operating the phase difference AF function. The focal position of the imaging lens is then adjusted according to the detected phase shift amount. Note that in the following, reference numerals are not appended when explanation does not need to discriminate between the light-blocking members 20A, 20B and they are referred to collectively as "light-blocking members".

In the first exemplary embodiment, the light-blocking members are, as illustrated in the example of FIG. 7, provided to the G filter pixels at the top left corner of the two pairs of the first array pattern A and the second array pattern B contained in the basic array pattern C. Namely, as illustrated in the example of FIG. 7, in the vertical direction, the light-blocking members 20A are placed in the (6n+1)th line, and the light-blocking members 20B are placed in the (6n+4)th line, wherein n is an integer of 0 or greater. In the example illustrated in FIG. 7, the light-blocking members are provided in all the basic array patterns C; however, there is no limitation thereto, and they may be provided only in some of the basic array patterns C in a specific region of the image pick-up device 20.

Thus in the color filter 21, the light-blocking members are provided to the top left corner G filter pixels of all the first array patterns A and second array patterns B, with the phase difference pixels placed periodically at 1 pixel every 3 pixels in the vertical direction and horizontal direction. Since there are accordingly comparatively many normal pixels placed at the periphery of the phase difference pixels, the interpolation precision can be raised in cases in which pixel values of the phase difference pixels are interpolated from the pixel values of the normal pixels. "Normal pixels" referred to above indicate, for example, pixels other than the phase difference pixels (for example pixels that do not include the light-blocking members 20A, 20B).

The image pick-up device 20 is classified into a first pixel group, a second pixel group, and a third pixel group. The first pixel group indicates, for example, the plural first pixels. The second pixel group indicates, for example, the plural second pixels. The third pixel group indicates, for example, the plural normal pixels. In the following a RAW image output from the first pixel group is referred to as a "first image", a RAW image output from the second pixel group is referred to as a "second image", and a RAW image output from the third pixel group is referred to as a "third image".

Returning to FIG. 3, the image pick-up device 20 outputs the first image (digital signals representing the pixel values of each of the first pixels) from the first pixel group, and outputs the second image (digital signals representing the pixel values of each of the second pixels) from the second pixel group. The image pick-up device 20 outputs the third image (digital signals representing the pixel values of each of the normal pixels) from the third pixel group. The third image output from the third pixel group is a chromatic image, and is, for example, a color image with the same color array as the array of the normal pixels. The first image, the second image, and the third image output from the image pick-up device 20 are temporarily stored in a volatile storage region in the memory 26 through the interface section 24.

The image processor 28 includes a normal processing section 30. The normal processing section 30 generates a chromatic normal image, serving as an example of a first display image, by processing the R, G, B signals corresponding to the third pixel group. The image processor 28 also includes a split-image processing section 32. The split-image processing section 32 generates achromatic split-images, serving as an example of second display images, by processing the G signals corresponding to the first pixel group and the second pixel group. The image processor 28 according to the first exemplary embodiment is implemented by an Application Specific Integrated Circuit (ASIC) that is a single integrated circuit combining multiple function circuits related to image processing. However, hardware configuration is not limited thereto, and, for example, configuration may be made with other hardware, such as a computer including a programmable logic device and CPU, ROM, and RAM.

The encoder 34 converts an input signal into a signal of another format and outputs the converted signal. The HYBRID FINDER 220 includes an LCD 247 that displays an electronic image. The number of pixels in a specific direction in the LCD 247 (for example the number of pixels in the horizontal direction that is the parallax generation direction), is fewer than the number of pixels in the same direction of the display section 213. The display controller 36 is connected to the display section 213 and the LCD 247, and displays images on the LCD 247 or the display section 213 by selectively controlling the LCD 247 and the display section 213. In the following, when there is no need to discriminate between the display section 213 and the LCD 247, they are referred to collectively as "display devices".

The imaging device 100 according to the first exemplary embodiment is configured to be switchable between a manual focus mode and an autofocus mode using the dial 212 (the focus mode switching section). When the manual focus mode has been selected, the display controller 36 displays on the display devices a live-view image onto which the split-images have been synthesized. However, when the autofocus mode has been selected by the dial 212, the CPU 12 operates as a phase difference detection section and an automatic focus adjusting section. The phase difference detection section detects the phase difference between the first image output from the first pixel group and the second image output from the second pixel group. The automatic focus adjusting section controls a lens drive section (not illustrated in the drawings) from the device controller 22 through the mounts 256, 346, based on the detected phase shift, to move the focal position of the imaging lenses 16 such that a defocus amount of the imaging lenses 16 becomes zero. The "defocus amount" referred to above indicates, for example, a phase shift amount between the first image and the second image.

The eyepiece detection section 37 detects a person (for example a photographer) looking into the finder eyepiece 242, and outputs the detection result to the CPU 12. The CPU 12 is accordingly able to ascertain, based on the detection result of the eyepiece detection section 37, whether or not the finder eyepiece 242 is being used.

The external I/F 39 is connected to a communication network, such as a Local Area Network (LAN) or the internet, and transmission and reception of various data between external devices (for example a printer) and the CPU 12 is controlled through the communication network. When connected to a printer as an external device, the imaging device 100 is accordingly capable of outputting captured still images to a printer and printing. When connected to a display as an external device, the imaging device 100 is capable of outputting captured still images and live-view images to a display, and displaying thereon.

Figure 9:
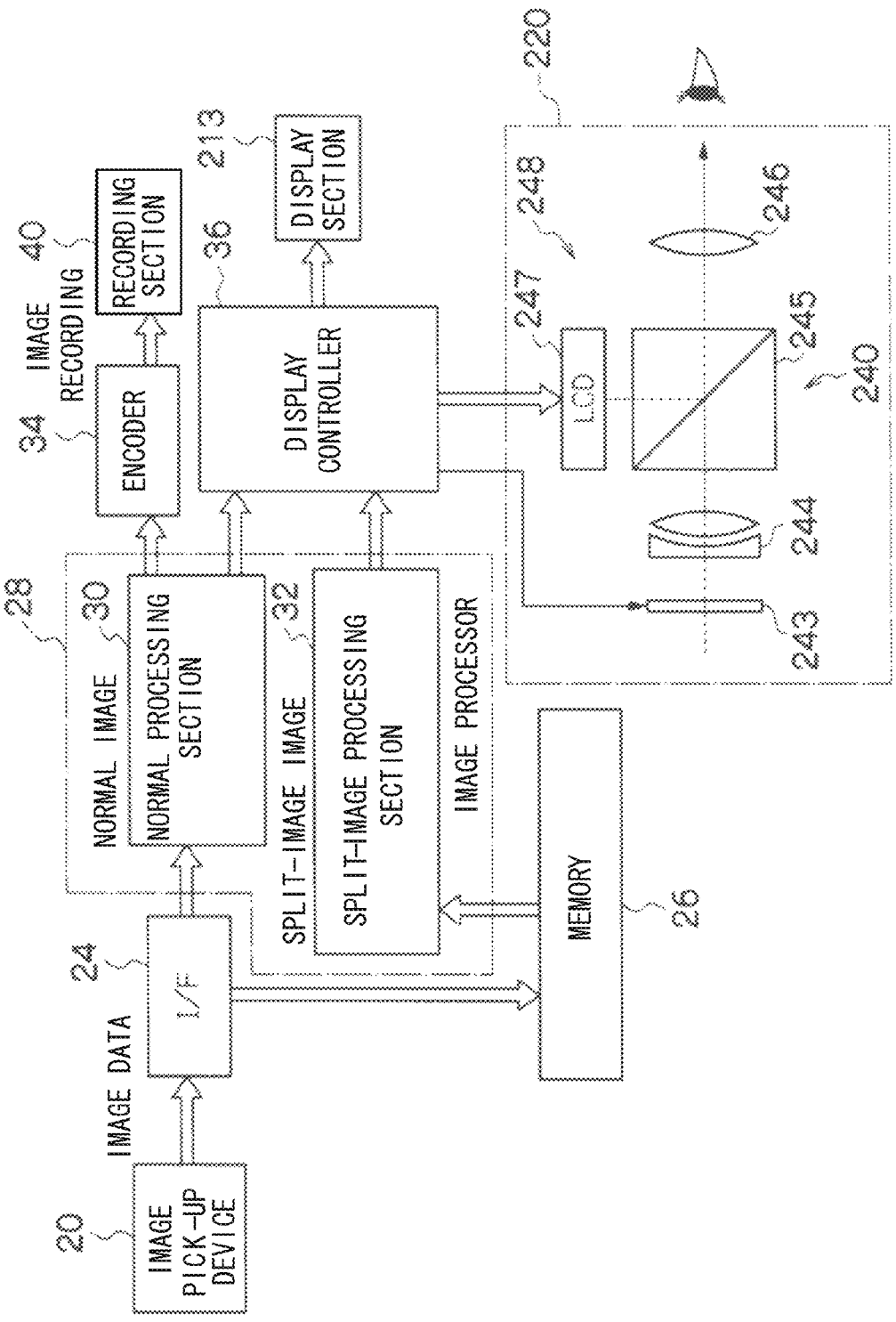
FIG. 9 is a block diagram illustrating an example of relevant functions of an imaging device according to the first exemplary embodiment.

FIG. 9 is a functional block diagram illustrating an example of relevant functions of the imaging device 100 according to the first exemplary embodiment. Common portions to the block diagram illustrated in FIG. 3 are appended with the same reference numerals.

The normal processing section 30 and the split-image processing section 32 each include a WB gain section, a gamma correction section, and a synchronization processing section (not illustrated in the drawings), and perform serial signal processing in each of the processing sections on the original digital signals (RAW images) temporarily stored in the memory 26. Namely, the WB gain section executes white balance (WB) by adjusting the gain of the R, G, B signals. The gamma correction section gamma corrects each of the R, G B signals for which WB has been executed by the WB gain section. The synchronization processing section performs color interpolation processing corresponding to the color filter array of the image pick-up device 20 (in this example a Bayer array), and generates synchronized R, G, B signals. The normal processing section 30 and the split-image processing section 32 perform parallel image processing on the RAW images each time one screen's worth of RAW image is acquired by the image pick-up device 20.

The normal processing section 30 is input with the R, G, B RAW images from the interface section 24, and uses the peripheral pixels of the same color from the first pixel group and the second pixel group (for example G pixels) to interpolate and generate the R, G, B pixels of the third pixel group. This thereby enables a normal image for recording to be generated based on the third image output from the third image output from the third pixel group.

The normal processing section 30 outputs image data of the generated normal image for recording to the encoder 34. The R, G, B signals processed by the normal processing section 30 are converted (encoded) by the encoder 34 into a recording signal and recorded in a recording section (see FIG. 9). Moreover, a normal image for display that is an image based on the third image processed by the normal processing section 30 is output to the display controller 36. In the following, for convenience of explanation, when there is no need to discriminate between the "normal image for recording" and the "normal image for display" the words "for recording" and the words "for display" are omitted, and they are referred to collectively as "normal images".

The image pick-up device 20 is capable of changing the respective exposure conditions of the first pixel group and the second pixel group (for example, the shutter speed with the electronic shutter), and is thereby capable of acquiring images under different exposure conditions at the same time. Consequently, the image processor 28 is capable of generating images over a wide dynamic range based on the images under different exposure conditions. Moreover, due to being able to acquire plural images under the same exposure conditions at the same time, adding these images together enables a high sensitivity image with little noise to be generated, or a high resolution image to be generated.

The split-image processing section 32 extracts the G signals of the first pixel group and the second pixel group from the RAW image temporarily stored in the memory 26, and generates an achromatic split-image based on the G signals of the first pixel group and the second pixel group. Each of the first pixel group and the second pixel group extracted from the RAW image is a pixel group made up from the G filter pixels as described above. The split-image processing section 32 is accordingly able to generate an achromatic left parallax image and an achromatic right parallax image based on the G signals of the first pixel group and of the second pixel group. In the following, for convenience of explanation, the above "achromatic left parallax image" is referred to as the "left eye image", and the above "achromatic right parallax image" is referred to as the "right eye image".

The split-image processing section 32 synthesizes the left eye image based on the first image output from the first pixel group together with the right eye image based on the second image output from the second pixel group to generate a split-image. Image data of the generated split-image is output to the display controller 36.

The display controller 36 generates image data for display based on the image data for recording corresponding to the third pixel group input from the normal processing section 30, and image data of the split-image corresponding to the first and second pixel groups input from the split-image processing section 32. For example, the display controller 36 synthesizes a split-image represented by image data input from the split-image processing section 32 in a display region of a normal image represented by image data for recording corresponding to the third pixel group input from the normal processing section 30. The image data obtained by synthesizing is then output to the display section 213.

Figure 10:
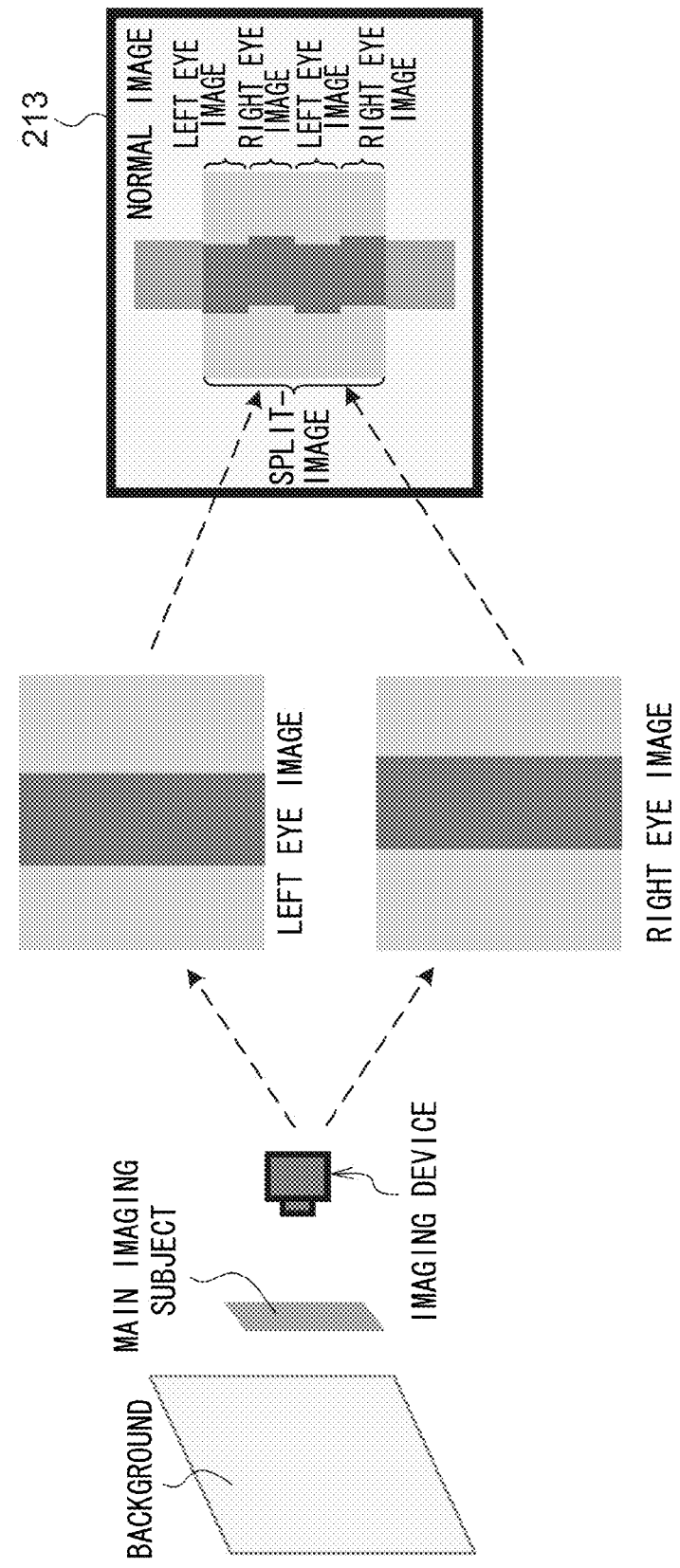
FIG. 10 is a screen shot diagram illustrating an example of a normal image and a split-image in a live-view image displayed on a display device as a Comparative Example to the first exemplary embodiment.

The split-image generated by the split-image processing section 32 is a multi-division image in which a portion of the left eye image and a portion of the right eye image are synthesized together. One example of what is referred to as "a multi-division image" is an image from synthesizing together an image portion of the upper half of a left eye image and an image portion of the lower half of a right eye image, in which there is displacement according to the focus state in a specific direction (for example the parallax generation direction) between the 2 divided upper and lower images. The split-image illustrated in FIG. 10 is given as another example thereof. The split-image illustrated in FIG. 10 is an image from synthesizing together a portion of a left eye image and a portion of a right eye image at a position corresponding to the position of a specific region on the display section 213, and is an image in which 4 images divided in the up-down direction are displaced from each other in a specific direction according to the focus state.

The method for synthesizing the split-image onto the normal image is not limited to the synthesis method in which the split-image is inserted in place of the image of a portion of a normal image. For example, a synthesis method may be employed in which the split-image is superimposed on the normal image. Moreover, a synthesis method may be employed in which, when superimposing the split-image, the transparencies of the image of the portion of the normal image onto which the split-image is to be superimposed and of the split-image are appropriately adjusted and superimposed. In this manner live-view images representing the successively captured imaging subject are displayed on the screen of the display section 213, and the displayed live-view images are images in which the split-image is displayed within the display region of the normal image.

The HYBRID FINDER 220 includes an OVF 240 and an EVF 248. The OVF 240 is a reverse Galileo finder including an objective lens 244 and an eyepiece lens 246, and the EVF 248 includes the LCD 247, a prism 245, and the eyepiece lens 246.

A liquid crystal shutter 243 is disposed at the front of the objective lens 244, and the liquid crystal shutter 243 blocks light such that the optical image is not incident to the objective lens 244 while the EVF 248 is being used.

The prism 245 reflects the electronic image or various data displayed on the LCD 247, guides these toward the eyepiece lens 246, and synthesizes an optical image together with the information (electronic image, various types of information) being displayed on the LCD 247.

When the finder switching lever 214 is turned in the arrow SW direction illustrated in FIG. 1, at each turn, switching is made between the OVF mode that enables a visual check to be made on an optical image using the OVF 240, and the EVF mode that enables a visual check to be made on the electronic image using the EVF 248.

In the OVF mode, the display controller 36 controls so that the liquid crystal shutter 243 is in a non-light blocking state, enabling a visual check to be made on an optical image through the eyepiece section. Moreover, only the split-image is displayed on the LCD 247. This thereby enables a finder image in which the split-image is superimposed on a portion of the optical image to be displayed.

In the EVF mode, the display controller 36 controls so that the liquid crystal shutter 243 is in a light blocking state, enabling a visual check to be made from the eyepiece section of only the electronic image being displaying on the LCD 247. Similar image data to the image data synthesized with the split-image for output on the display section 213 is input to the LCD 247, thereby enabling an electronic image to be displayed with the split-image synthesized onto a portion of the normal image, similarly to with the display section 213.

However, for example, when a split-image such as that illustrated FIG. 10 is displayed on the display section 213 together with a normal image, depending on the parallax between the left eye image and the right eye image, sometimes it is difficult to visually check displacement between the image based on the left eye image and the image based on the right eye image in the split-image.

Thus in the imaging device 100 according to the first exemplary embodiment, the image processor 28 performs processing to correct parallax and processing to emphasize edges in the split-image. What is referred to here as "processing to correct parallax" indicates, for example, processing to correct parallax (parallax appearing through the split-image) that depends on the amount of phase shift imparted to the split-image by the image processor 28. In the following, for ease of explanation, the above "processing to correct parallax" and "processing to emphasize edges" will be referred to collectively as "parallax correction processing".

Figure 11:
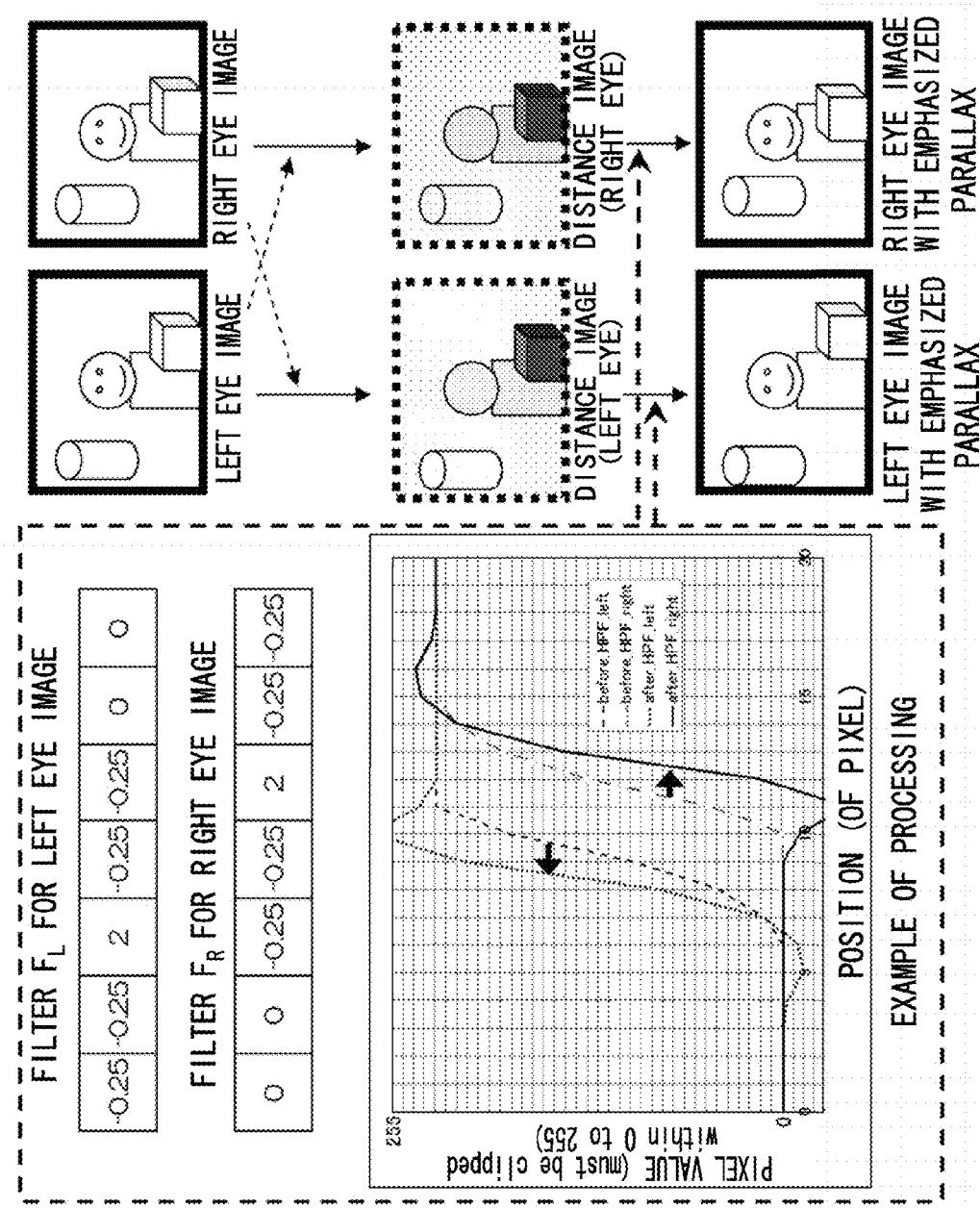
FIG. 11 is a diagram to accompany explanation of filter processing according to the first exemplary embodiment.

To perform parallax correction processing, the image processor 28 may first detect corresponding points in the left eye image and the right eye image, and measure the parallax. A correlation method or the like may be employed in detection of the corresponding points in the left eye image and the right eye image. For example, in a two dimensional coordinate system, a kernel such as 15 pixels in the x direction and 1 pixel in the y direction may be scanned, and corresponding points in the left eye image and the right eye image detected by searching for locations where there is the least sum of squares of differences in the pixel values. The parallax measurement result may, for example, be represented as a monochrome image (distance image) that is brighter the further away, and darker the closer, as illustrated in FIG. 11. It is also possible to measure the parallax at a sub-pixel level. Details of such a method are for example described in "Optimization of Correlation Function and Sub-Pixel Estimation Method on Block Matching" (Information Processing Society of Japan research report) by Motoki ARAI et al., volume 2004, issue 40 (CVIM-144), pages 33-40) and the like.

Generally in parallax measurement, there is the issue that "false detection is easily made with large parallax", and the issue that "it is difficult to detect corresponding points for corresponding points between flat portions (where the sum of squares of difference is small)". However, in the single lens imaging device 100 configured from single imaging lenses 16+the image pick-up device 20 employed for phase difference detection, since the original parallax is extremely small, the former false detections are generally uncommon. For the latter false detections too, it can be said that even if, for example, phase was shifted with an error in corresponding point detection, there is little final effect on image quality due to it originally being a flat section.

When performing parallax correction processing, the image processor 28 sets a phase shift filter (referred to below simply as "filter") at each local in the left eye image and the right eye image. For example, at a given location in the left eye image, in cases in which phase is shifted by only one pixel, filter F ($F_L$, $F_R$) is set with filter coefficients (an example of image processing coefficients) intentionally shifted by 1 (pixel) about the center of filtering, as illustrated in FIG. 11. A single filter F configured by hardware suffices, set with respective filter coefficients for use on respective images during convolution operation (referred to below as filter processing) on the left eye image, or filter processing on the right eye image.

The filter F is a DC component filter including a high pass filter. This thereby enables edge emphasis and phase shifting to be performed at the same time. The example filters $F_L$, $F_R$ illustrated in FIG. 11 each employ a kernel size (operation target pixel range) of 1×7 pixels, and the filter coefficients of each of the filters $F_L$, $F_R$ have the center of the filter coefficient shifted in opposite directions to each other from the kernel center. In the example illustrated in FIG. 11, the filter coefficient center of the filter $F_L$ is shifted by 1 pixel worth to the left, and in the filter $F_R$ is shifted by 1 pixel worth to the right. This thereby enables 2 pixels worth of expansion (emphasis) to be achieved in parallax overall.

Figure 12:
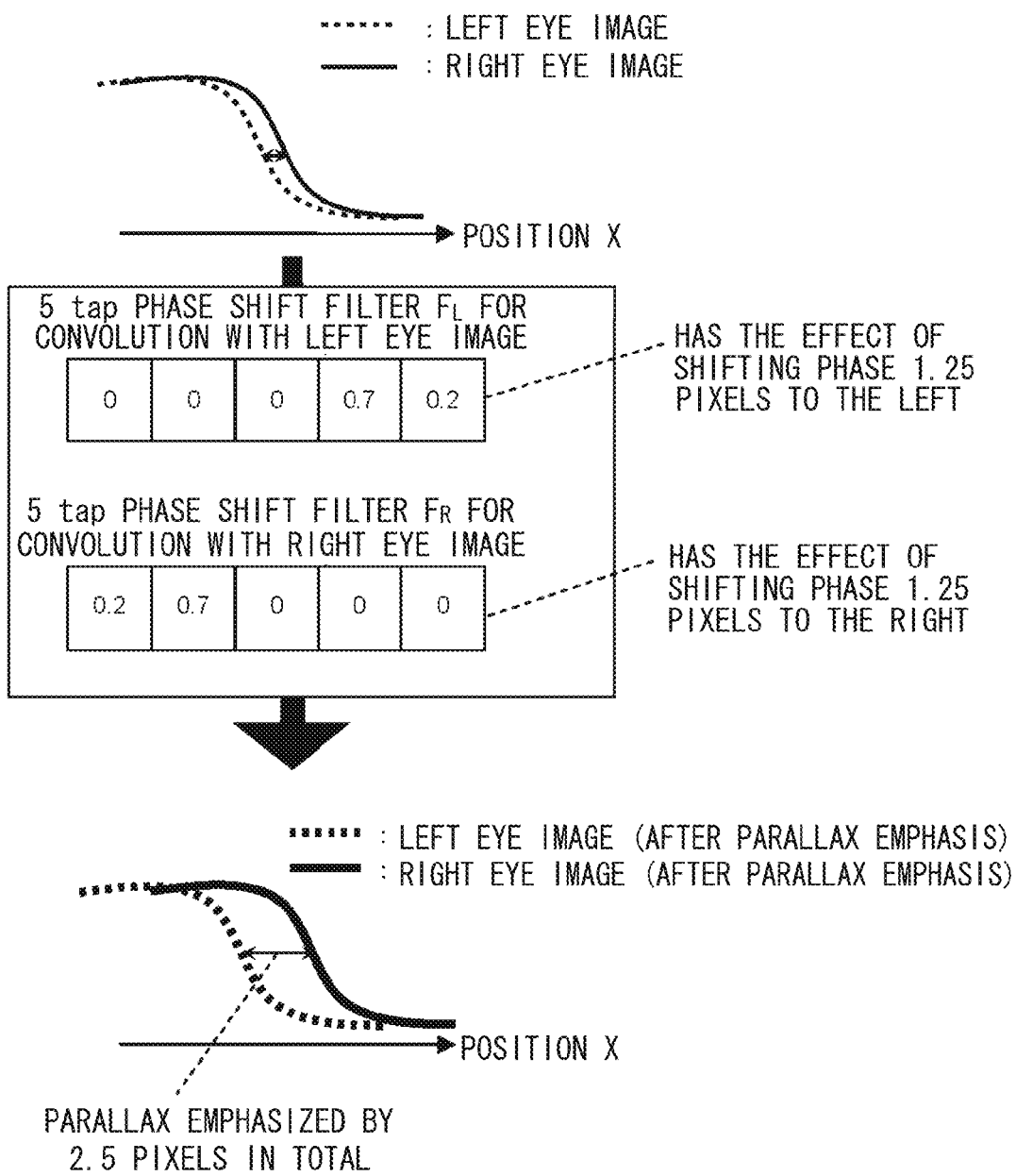
FIG. 12 is a schematic diagram illustrating an example of a filter employed in filter processing according to the first exemplary embodiment, different to the filter illustrated in FIG. 11.

Moreover, although in the example illustrated in FIG. 11 an example is given with a kernel size of 1×7 pixels, there is no limitation thereto and the kernel size may be 1×5 pixels. In such cases, for example as illustrated in FIG. 12, the filter coefficients of each of the filters $F_L$, $F_R$ have the center of the filter coefficient shifted in opposite directions to each other from the kernel center. In the example illustrated in FIG. 12, the filter coefficient center of the filter $F_L$ is shifted by 1.25 pixels worth to the left, and in the filter $F_R$ is shifted by 1.25 pixels worth to the right. This thereby enables 2.5 pixels worth of expansion (emphasis) to be achieved in parallax overall.

Figure 13:
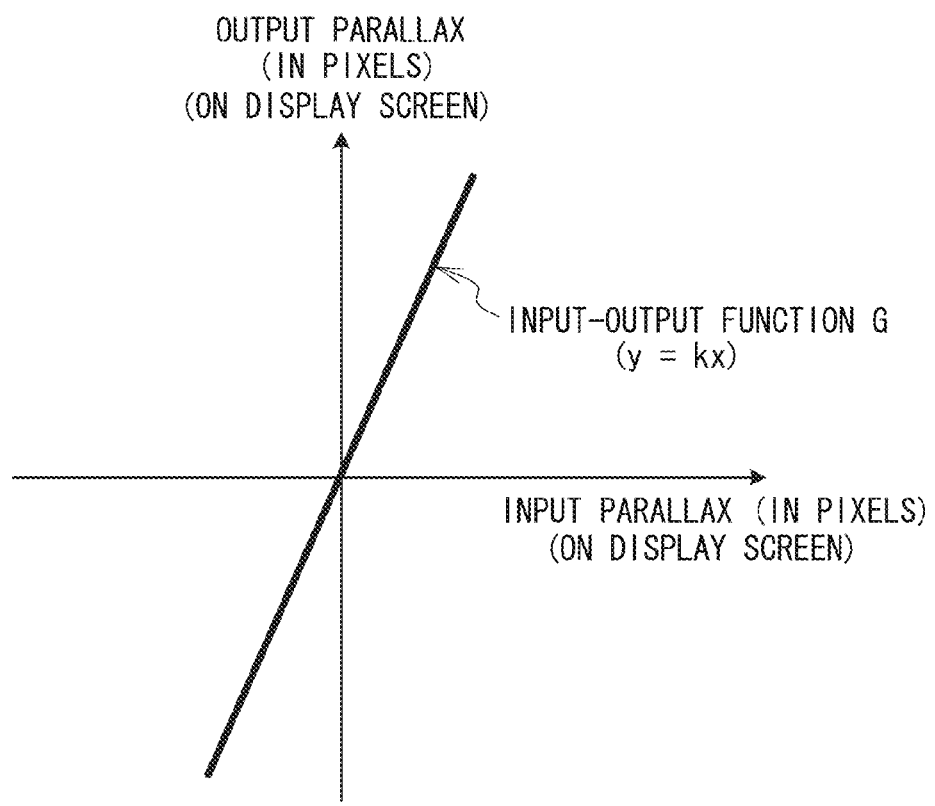
FIG. 13 is a graph illustrating an example of an input-output function according to the first exemplary embodiment.
Figure 14:
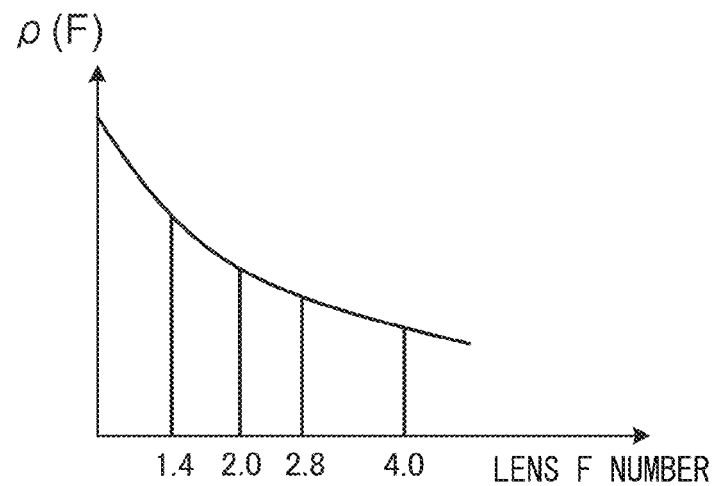
FIG. 14 is a graph illustrating an example of correspondence relationships between F number of an imaging lens and characteristic values of the phase difference pixels included in an image pick-up device of an imaging device according to the first exemplary embodiment.

In the imaging device 100 according to the first exemplary embodiment, the image processor 28 decides on the parallax to finally output as the split-image parallax using, for example, an input-output function G illustrated in FIG. 13, and decides on the filter coefficients of the filters $F_L$, $F_R$ based on the decided parallax.

FIG. 13 illustrates an example of the input-output function G according to the first exemplary embodiment. In FIG. 13, the horizontal axis (for example the x axis) indicates the parallax on the display screen of the display device and is the parallax pre-conversion by the input-output function G (referred to below as the "input parallax"). In FIG. 13, the vertical axis (for example the y axis) indicates the parallax on the display device of the display device and is the parallax post-conversion by the input-output function G (referred to below as the "output parallax"). As illustrated in the example of FIG. 13, the input-output function G is a linear function of "y=kx" with a slope of an expansion amount coefficient k. In the imaging device 100 according to the first exemplary embodiment, a value exceeding 1 is employed for "k". By employing a value exceeding 1 for "k", the linear function of "y=kx" means that the output parallax with respect to the input parallax is expanded, and also means that the output parallax decreases on approaching perfect focus (in-focus position) since the linear function passes through the origin. The expansion amount coefficient k may be determined according to plural factors for generating displacement between the left eye image and the right eye image in the split-image displayed on the display device. Note that although an example is given of the expansion amount coefficient k, there is no limitation thereto and an expansion amount may be uniquely determined according to the input parallax. An example of such a case is an embodiment that derives expansion amounts uniquely determined according to input parallax by employing a table.

Reference here to "plural factors" includes the F number as an example of the aperture number of the imaging lenses 16, the real focal distance of the imaging lenses 16, characteristic values of the phase difference pixels, the depth distance to the focal position of the imaging lenses 16 (the depth distance along the optical axis direction), and the depth distance to the imaging subject position. Shutter speed is also, for example, an example of one of the "plural factors". The light attenuation amount due to an ND filter, or the light transmission amount of the ND filter, are also, for example, examples of one of the "plural factors". A constant factor of (the vertical angle of the image pick-up device 20)/43.267 is also, for example, an example of one of the "plural factors". A constant factor based on the number of pixels in the parallax generation direction of the image pick-up device 20 and the number of pixels in the parallax generation direction on the display screen of the display device is also, for example, an example of one of the "plural factors". A constant factor based on the number of pixels in the parallax generation direction of the image pick-up device 20, the number of pixels in the parallax generation direction on the display screen of the display device, and the pitch size between pixels included in the image pick-up device 20 is also, for example, an example of one of the "plural factors".

In the imaging device 100 according to the first exemplary embodiment, plural factors for defining the displacement amount between the first image and the second image displayed on the display device are employed as the above "plural factors". Although an example has been given of the displacement amount in the split-image displayed on the display device between the left eye image and the right eye image as the "displacement amount between the first image and the second image displayed on the display device", a displacement amount between a first image and a second image not displayed on the display device may be employed.

In the imaging device 100 according to the first exemplary embodiment, the displacement amount between images based on the left eye image and the right eye image in a split-image displayed on the display device may be expressed by a function that depends on the F number, which is an example of the aperture number of the imaging lenses 16. The displacement amount between images based on the left eye image and the right eye image may also be expressed as a function that depends on the real focal distance of the imaging lenses 16, the characteristic values of the phase difference pixels, and the depth distance to the focal position of the imaging lenses 16. The displacement amount between images based on the left eye image and the right eye image may also be expressed as a function that depends on the depth distance to the imaging subject position and the vertical angle of the image pick-up device 20. The displacement amount between images based on the left eye image and the right eye image may also be expressed as a function that depends on the pitch between pixels included in the image pick-up device 20 and the number of pixels in the parallax generation direction of the image pick-up device 20, and on the number of pixels in the parallax generation direction on the display screen of the display device.

For the function representing the displacement amount between images based on the left eye image and the right eye image, for example, the displacement amount between images based on the left eye image and the right eye image may be represented as proportional to, respectively: a value of the depth distance to the focal position of the imaging lenses 16 minus the depth distance to the imaging subject position; the vertical angle of the image pick-up device 20; and to the real focal distance of the imaging lenses 16. For the function representing the displacement amount between images based on the left eye image and the right eye image, for example, the displacement amount between images based on the left eye image and the right eye image may be represented as proportional to the number of pixels in the parallax generation direction on the display screen of the display device. For the function representing the displacement amount to an image based on the left eye image and the right eye image, for example, the displacement amount between images based on the left eye image and the right eye image may also be represented as being inversely proportional to a value of the depth distance to the focal position of the imaging lenses 16 minus the product of the vertical angle of the image pick-up device 20 and the real focal distance of the imaging lenses 16. For the function representing the displacement amount to an image based on the left eye image and the right eye image, for example, the displacement amount between images based on the left eye image and the right eye image may also be represented as being inversely proportional to the depth distance to the focal position of the imaging lenses 16. Moreover, for the function representing the displacement amount to an image based on the left eye image and the right eye image, for example, the displacement amount between images based on the left eye image and the right eye image may also be represented as being inversely proportional to the pitch between pixels included in the image pick-up device 20 and the number of pixels in the parallax generation direction of the image pick-up device 20.

Figure 15:
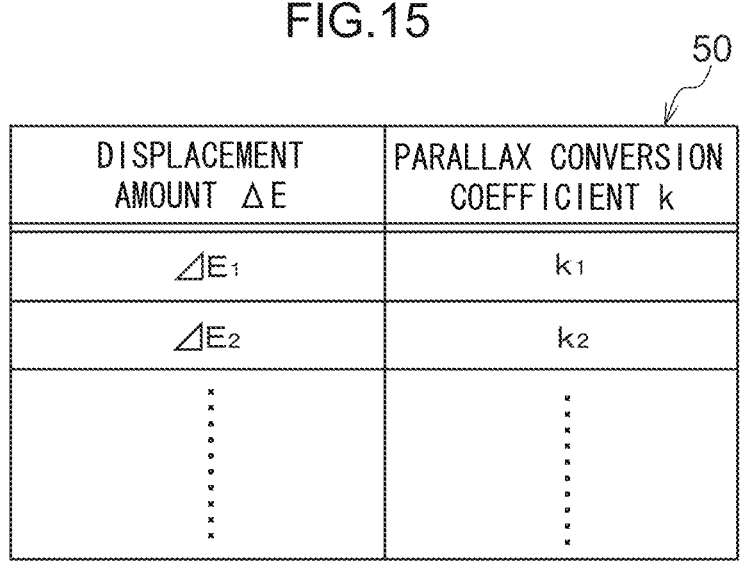
FIG. 15 is a schematic diagram illustrating an example of a lookup table in which displacement amounts between a left eye image and a right eye image have been associated with parallax conversion coefficients.

The imaging device 100 according to the first exemplary embodiment includes a lookup table (LUT) 50 illustrated as an example in FIG. 15. The LUT 50 is stored in a specific storage region (for example in the memory 26). As illustrated in the example in FIG. 15, the LUT 50 is a table that designates, as output, a table in which a displacement amount $\Delta E$ is designated as input and an expansion amount coefficient k is designated as output. The image processor 28 is accordingly able to employ the LUT 50 to derive a uniquely determined expansion amount coefficient k according to the displacement amount computed according to the function representing the displacement amount between images based on the left eye image and the right eye image.

When performing parallax correction processing, the image processor 28 next performs phase shifting on the left eye image and the right eye image by performing filter processing using the filters $F_L$, $F_R$ set as described above. Namely, filter processing is performed using, for example, the filter $F_L$ illustrated in FIG. 11 for a pixel group of 1×7 pixels centered on the target pixel (pixel of interest) for which corresponding point detection was performed in the left eye image. The pixel of interest is thereby edge emphasized, and phase shifted by 1 pixel worth to the left. Similarly, filter processing is performed using, for example, the filter $F_R$ illustrated in FIG. 11 for a pixel group of 1×7 pixels centered on the pixel of interest in the right eye image corresponding to the pixel of interest in the left eye image. The pixel of interest is thereby edge emphasized, and phase shifted by 1 pixel worth to the right. Thereby, the pixel positions are expanded by 2 pixels worth overall, and parallax is expanded by displacing the pixel of interest in the left eye image 1 pixel worth of phase shift to the left, and by displacing the pixel of interest in the right eye image 1 pixel worth of phase shift to the right.

The filter according to the first exemplary embodiment also performs edge emphasis at the same time as parallax expansion. However, generally the left eye image and the right eye image captured by a 3D imaging device employing phase difference pixels have the characteristic of being blurred in locations where there is large parallax. There is a possibility that too much edge emphasis on the blurred locations would lead to an increase in noise.

Thus in the imaging device 100 according to the first exemplary embodiment, processing is performed to weaken the amount of edge emphasis according to the parallax expansion. This thereby enables distinct locations to be made more distinct, while reducing the noise of blurred locations.

The following method may, for example, be considered for correcting the amount of edge emphasis according to the parallax expansion. First, consider frequency characteristics for filtering expressible as the following Equation (1).

(frequency characteristics of the filter coefficient)=
(DC component)+α×(HPF component)=(DC component)+α×((DC component)−(LPF component))      Equation (1)

Figure 16A:
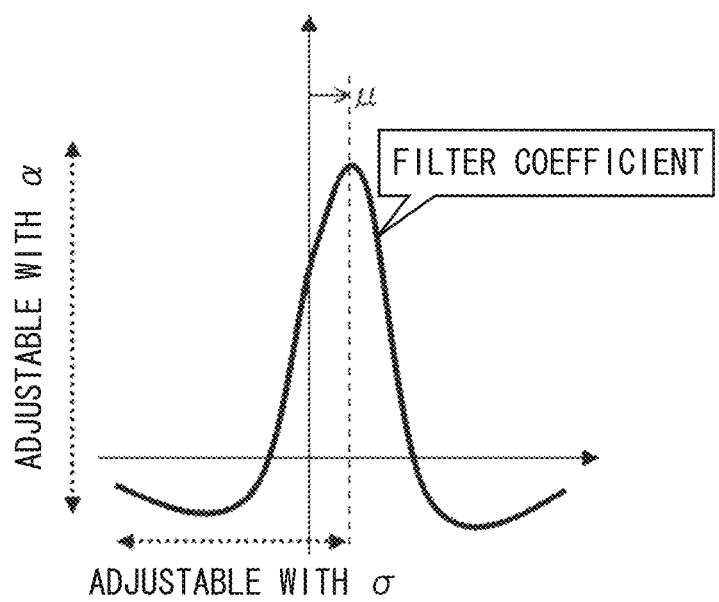
FIG. 16A is graph schematically illustrating a filter coefficient.

Taking α as the strength of the edge emphasis, μ as the phase shift amount for displacement, treating the LPF component as a Gaussian curve with standard deviation σ, and performing Fourier transformation on Equation (1), gives a filter coefficient of the following equation. Note that the filter coefficient is expressed, for example, as illustrated in FIG. 16A. The edge emphasis strength α may be controlled by the frequency band σ. The HPF strength may controlled according to the parallax by setting the edge emphasis strength α as a function of the parallax (pixels) of the original image (see, for example, FIG. 16B).

$$\text{(Filter coefficient)} = \delta(x-\mu) + \alpha\left(\delta(x-\mu) - \frac{1}{\sqrt{2\pi\sigma^2}}e^{-\frac{(x-\mu)^2}{2\sigma^2}}\right)$$

$$= (1+\alpha)\delta(x-\mu) - \frac{\alpha}{\sqrt{2\pi\sigma^2}}e^{-\frac{(x-\mu)^2}{2\sigma^2}}$$

[Equation 1]

(Wherein δ is a delta function)

Figure 17:
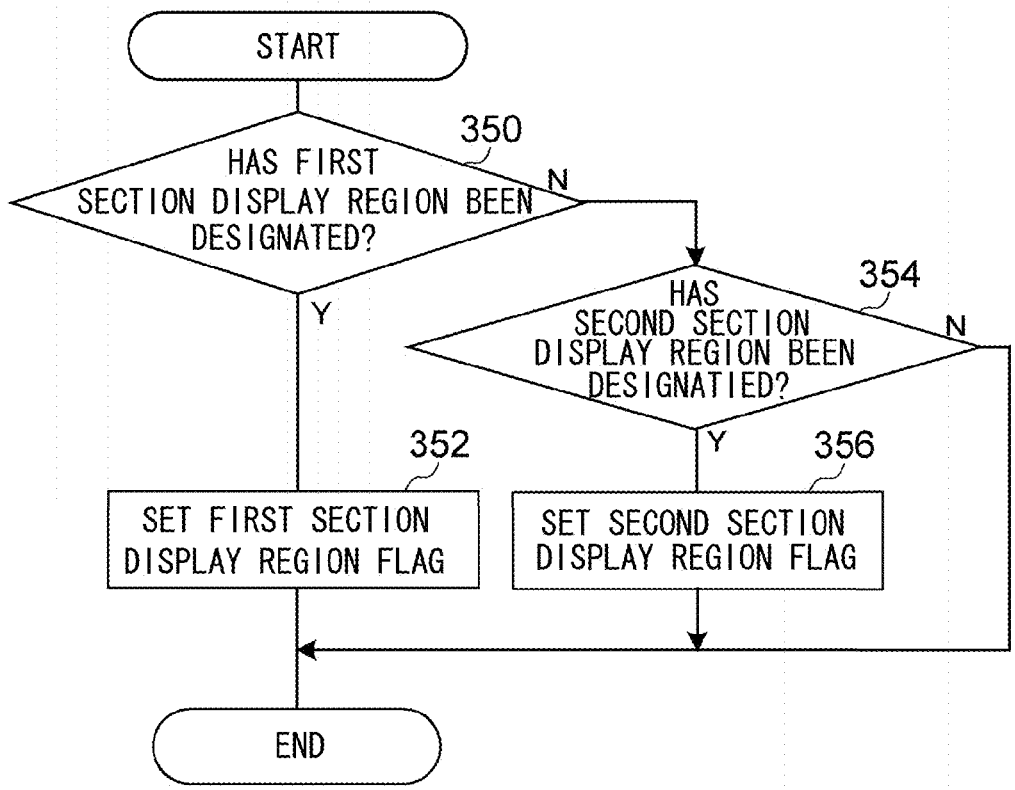
FIG. 17 is a flowchart illustrating an example of flow of region designation processing according to the first exemplary embodiment.

As operation of the first exemplary embodiment, explanation next follows regarding region designation processing performed at every specific interval (for example every second) in the image processor 28, with reference to FIG. 17. Reference here to "region designation processing" indicates, for example, processing to designate the region where the displacement amount between the left eye image and the right eye image is to be expanded in the display region of the split-image (see, for example, FIG. 18) by the image processor 28. An explanation is given here of an example in which region designation processing is performed in the image processor 28; however the present invention is not limited thereto. The region designation processing may, for example, be performed in the imaging device 100 by the CPU 12 executing a region designation processing program.

Figure 18:
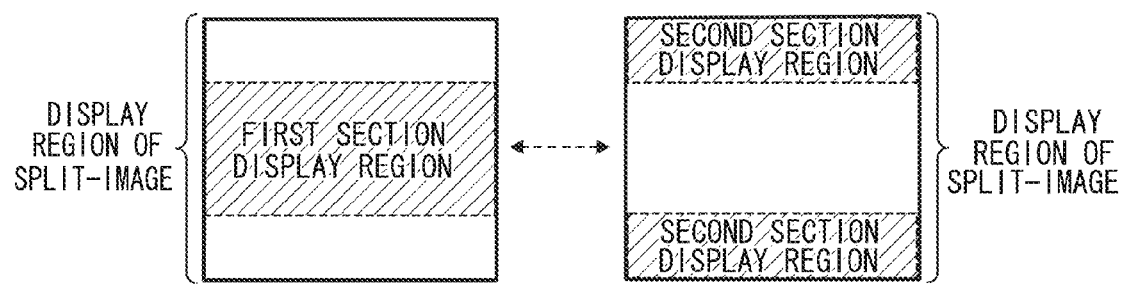
FIG. 18 is a schematic diagram illustrating an example of a first section display region and second section display regions in a display region of a split-image displayed on a display device included in an imaging device according to the first exemplary embodiment.

Moreover, in order to avoid confusion, explanation follows regarding a case, as illustrated in the example in FIG. 18, in which the display region in the display section 213 of the split-image is classified into a first section display region and a second section display region. In the example illustrated in FIG. 18, out of divided regions obtained by dividing the display region of the split-image into 3 in the top-bottom direction, a central divided region is taken as the first section display region, and the other regions (the upper edge portion and the lower edge portion of the display region of the split-image) are taken as second section display regions. Thus any one out of the first section display region, the second section display regions, or the entire display region of the split-image is designated by performing region designation processing.

The layouts of the first section display region and the second section display regions are not limited to the layouts illustrated in FIG. 18, and, for example, the top-bottom direction length of the first section display region may be made shorter, and the surface area of the second section display regions may be widened as illustrated in FIG. 29A. Moreover, the first section display region may be a circular shaped region at a central portion of the split-image display region, as illustrated in the example in FIG. 29B. Moreover, the first section display region may be a square shaped region at a central portion of the split-image display region, as illustrated in the example in FIG. 29C. In order to avoid confusion, the split-image display region is classified here into two regions, the first section display region and the second section display regions; however there is no limitation thereto, and obviously classification may be made into three or more regions.

In FIG. 17, at step 350 determination is made by the image processor 28 as to whether or not the first section display region has been designated through the operation section 14. Affirmative determination is made at step 350 and processing transitions to step 352 if the first section display region has been designated. At step 352, a first section display region flag is set by the image processor 28 to indicate that the first section display region has been designated, and then the region designation processing is ended. The example of the method for designating the first section display region here is a designation method using the operation section 14; however the designation method is not limited thereto. For example, the CPU 12 or the image processor 28 may determine that the first section display region has been designated in cases in which it has been determined based on detection results of the eyepiece detection section 37 that the HYBRID FINDER 220 is being employed.

Processing transitions to step 354 in cases in which the first section display region has not been designated at step 350. At step 354, the image processor 28 determines whether or not the second section display regions have been designated through the operation section 14. The region designation processing is ended if at step 354 the second section display regions have not been designated. Affirmative determination is made and processing transitions to step 356 if at step 354 the second section display regions have been designated. At step 356, a second section display region flag is set by the image processor 28 to indicate that the second section display regions have been designated, and then the region designation processing is ended.

Figure 19:
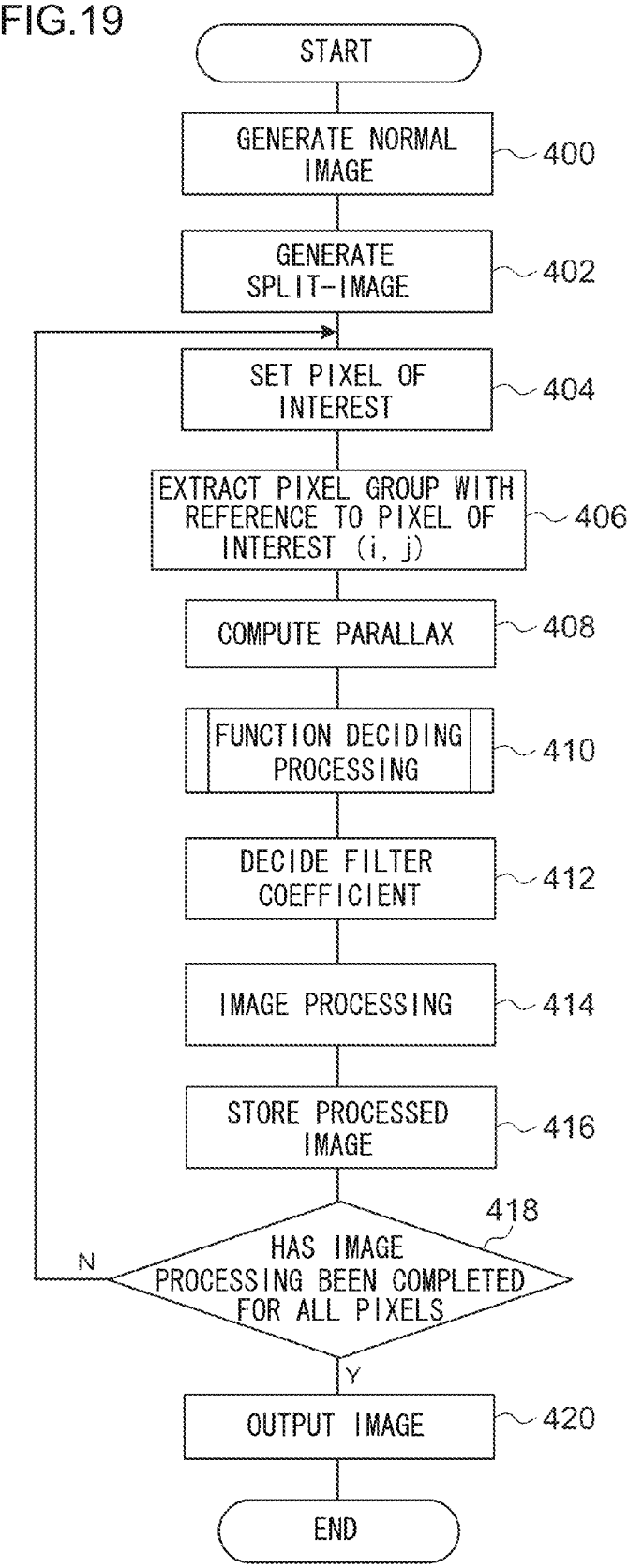
FIG. 19 is a flowchart illustrating an example of flow of image output processing according to the first exemplary embodiment.

As operation of the first exemplary embodiment, explanation next follows regarding image output processing, including the parallax correction processing described above, performed by the image processor 28, with reference to FIG. 19. Note that in the example here, the image output processing is performed by the image processor 28, however the present invention is not limited thereto, and, for example, the image output processing may be performed in the imaging device 100 by the CPU 12 executing an image output processing program.

At step 400 in FIG. 19, a normal image is generated by the image processor 28 based on the input third image. The normal image generated at step 400 is stored by the image processor 28 in a specific storage region (for example the memory 26).

At the next step 402, the left eye image and the right eye image are acquired by the image processor 28, and a split-image is generated based on the acquired left eye image and the right eye image.

Then at step 404, a processing target pixel from out of all the pixels of one of the left eye image or the right eye image included in a specific region of the split-image generated at step 402 is set by the image processor 28. At this stage, the image processor 28 acquires the left eye image and the right eye image (an example of a particular section image) at the position corresponding to the position of the region in the split-image designated by the above region designation processing. For example, if the first section display region flag has been set, then the left eye image and the right eye image at the position corresponding to the position of the first section display region illustrated in FIG. 18 are acquired. Moreover, if the second section display region flag has been set, then the left eye image and the right eye image at the positions corresponding to the position of the second section display regions illustrated in FIG. 18 are acquired. Moreover, if the first section display region flag and the second section display region flag have not been set, then the left eye image and the right eye image are acquired for the entire display region of the split image. For example, the left eye and right eye images are acquired at the position corresponding to the position of the upper half portion of the entire display region of the split-image, and the left eye image and the right eye image are acquired at the position corresponding to the position of the lower half portion of the entire display region of the split-image. Then a split-image is generated based on the acquired left eye image and right eye image. In the following, in order to avoid confusion, a processing target pixel (pixel of interest (i, j) is set from out of all the pixels in the left eye image at a position corresponding to the position of the first display region in the split-image generated at step 402. In such cases, for example, if the image size of the left eye image is m×n pixels, then the pixel of interest is transitioned each time step 404 is performed, in sequence from the pixel (1, 1) to the pixel (m, n).

At the next step 406, a pixel group of specific block size, (Cx×Cy) pixels, is extracted by the image processor 28 as a pixel group with reference to the pixel of interest (i, j) set at step 404. At the next step 408, the image processor 28 computes parallax representing the displacement amount of corresponding pixels in the right eye extracted at step 406 with respect to each of the pixels in the left eye image extracted at step 406.

Figure 20:
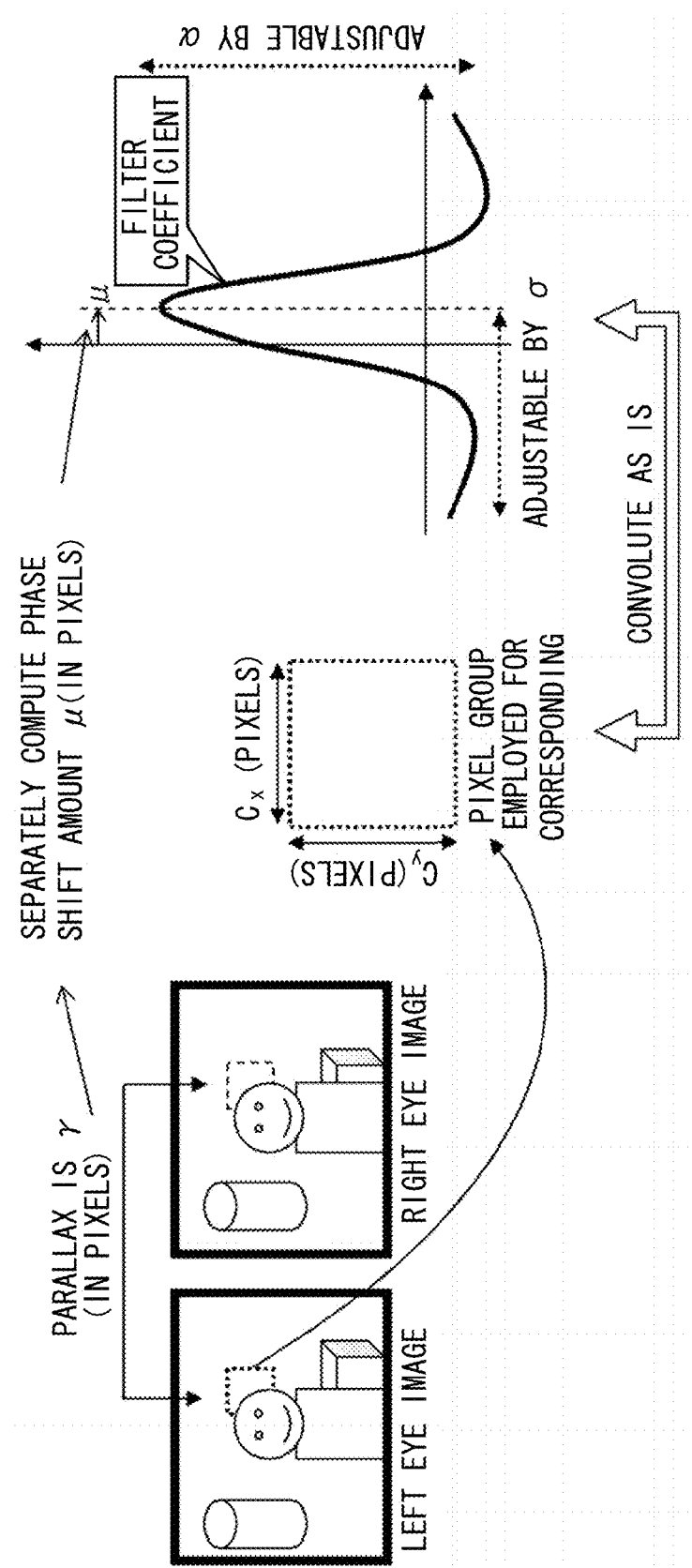
FIG. 20 is a schematic diagram illustrating an example of a manner in which filter processing is performed during parallax computation.

At step 408, based on the pixel group of the left eye image extracted at step 406, the image processor 28, for example, first searches for a pixel group with characteristic points matching the right eye image. Namely, as in the example illustrated in FIG. 20, degree of matching is evaluated between the pixel group (block) extracted from the left eye image, and, from out of the right eye image, blocks in the right eye image to correspond to the pixel group (block) extracted from the left eye image. Then, the pixel acting as a reference in the right eye image block when there is the maximum degree of matching between blocks is set as the corresponding point pixel of the right eye image corresponding to the pixel of interest in the left eye image. In the block matching method of the first exemplary embodiment, the degree of matching is evaluated between blocks by, for example, employing the sum of squared difference (SSD) in brightness of the pixels in each of the blocks as a degree of matching evaluation function (an SSD block matching method).

In an SSD block matching method, the computation is performed according to the following equation on each of the pixels f (i, j), g (i, j) in the blocks of both comparison target images.

$$SSD = \sum_i \sum_j \{f(i, j) - g(i, j)\}^2 \qquad \text{[Equation 2]}$$

The computation of [Equation 2] is performed while moving the position of the block in the right eye image within a specific search region, and the pixel at the position in the search region with the minimum SSD value is set as the search target pixel. Then, the parallax representing the displacement amount between the pixel of interest in the left eye image and the corresponding pixel found in the right eye image is computed.

Figure 21:
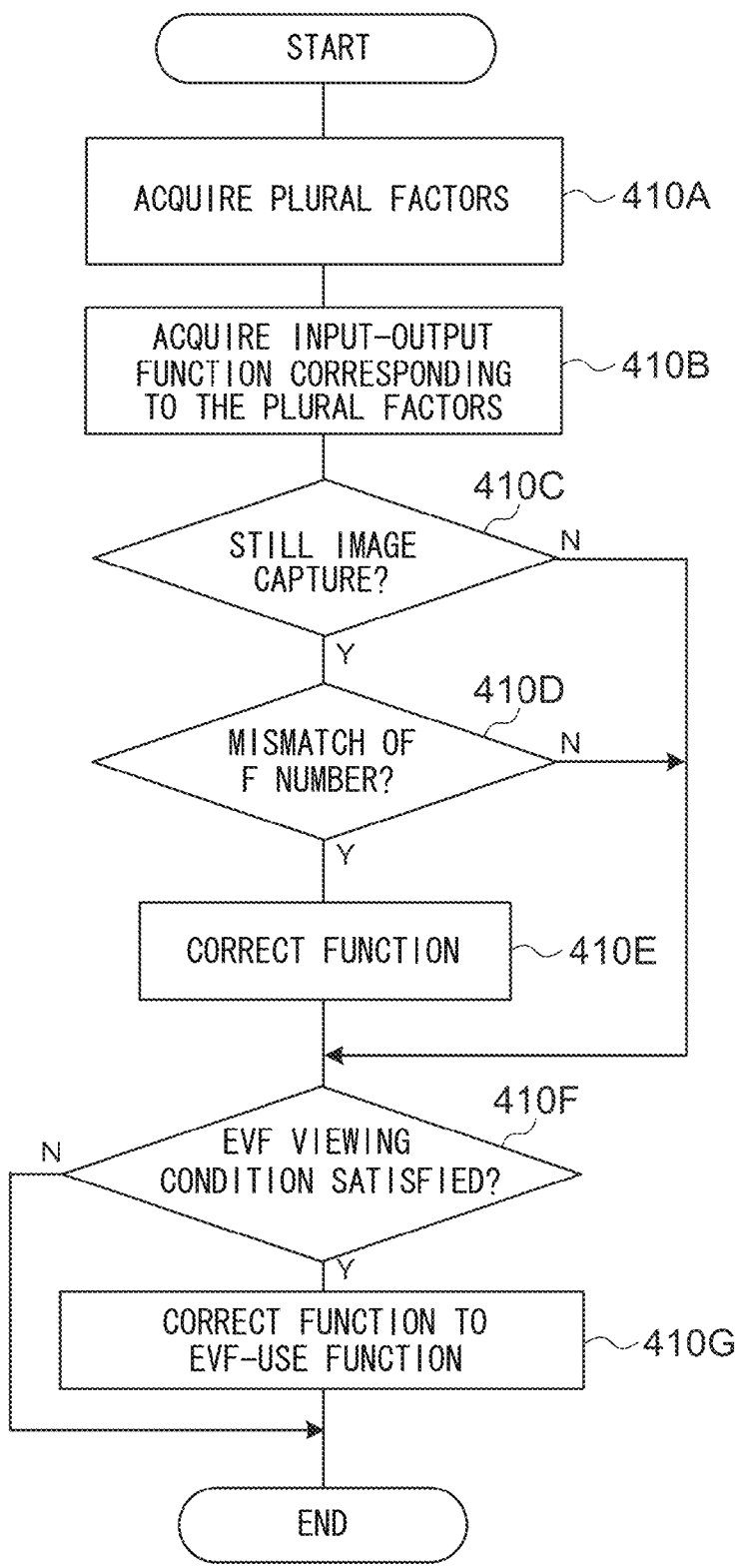
FIG. 21 is a flowchart illustrating an example of flow of function deciding processing according to the first exemplary embodiment.

At the next step 410, an input-output function G is decided by the image processor 28 performing function deciding processing. FIG. 21 is a flow chart illustrating an example of flow of the function deciding processing.

As illustrated in FIG. 21, at step 410A plural factors are acquired by the image processor 28.

At the next step 410B, the input-output function G corresponding to the plural factors acquired at step 410A is acquired by the image processor 28. For example, the image processor 28 computes here the displacement amount based on the plural factors acquired at step 410A; then decides on an expansion amount coefficient k corresponding to the computed displacement amount by derivation from the LUT 50, and acquires the input-output function G with the slope of the decided expansion amount coefficient k. The expansion amount coefficient k acquired at step 410B is an example of a non-use expansion amount and a display section in-use expansion amount of the present invention.

At the next step 410C, determination is made by the image processor 28 as to whether or not image capture currently specified is still image capture. Negative determination is made at step 410C if the image capture currently specified is not still image capture, and processing transitions to step 410F. Affirmative determination is made at step 410C if the image capture currently specified is still image capture, and processing transitions to step 410D.

At step 410D determination is made by the image processor 28 as to whether or not there is a mismatch between the F number currently set as the F number to be employed during still image capture and the F number currently set as the F number to be employed during live-view image capture. Affirmative determination is made at step 410D if there is a mismatch between the F number currently set as the F number to be employed during still image capture and the F number currently set as the F number to be employed during live-view image capture, and processing transitions to step 410E. Negative determination is made at step 410D if the F number currently set as the F number to be employed during still image capture matches the F number currently set as the F number to be employed during live-view image capture, and processing transitions to step 410F.

At step 410E, the image processor 28 corrects the input-output function G acquired at step 410A according to the F number currently set as the F number to be employed in still image capture. Here the image processor 28 decides on the slope of the input-output function G based on the F number currently set as the F number to be employed in still image capture and the F number currently set as the F number to be employed in live-view image capture. More specifically, a ratio is computed of a characteristic value of the phase difference pixel designated by the F number currently set as the F number to be employed in still image capture with respect to the characteristic value of the phase difference pixel designated by the F number currently set as the F number to be employed in live-view image capture. Then the input-output function G is corrected by multiplying the computed ratio by the expansion amount coefficient k of the input-output function G currently being acquired. In the following, for ease of explanation, the characteristic value of the phase difference pixel is expressed as $\rho(F)$, wherein "F" indicates the F number.

Figure 22:
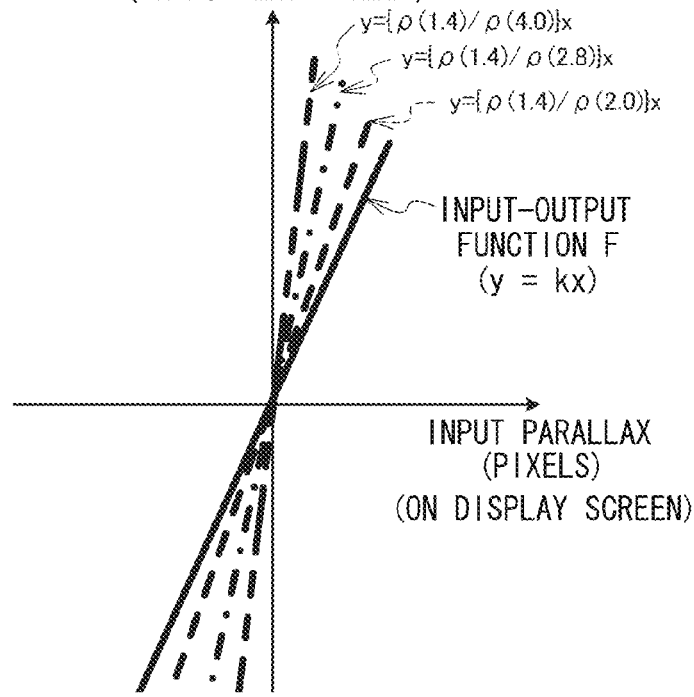
FIG. 22 is a graph illustrating an example of an input-output function prior to, and post, correction according to the first exemplary embodiment.

For example, as illustrated in FIG. 22, if the F number to be employed in still image capture is "1.4", and the F number to be employed in live-view image capture is "4.0", then the expansion amount coefficient k is corrected to "$\rho(1.4)/\rho(4.0)$". Moreover, if the F number to be employed in still image capture is "1.4" and the F number to be employed in live-view image capture is "2.8", then the expansion amount coefficient k is corrected to "$\rho(1.4)/\rho(2.8)$". Moreover, if the F number to be employed in still image capture is "1.4" and the F number to be employed in live-view image capture is "2.0", then the expansion amount coefficient k is corrected to "$\rho(1.4)/\rho(2.0)$".

Thus in the imaging device 100 according to the first exemplary embodiment, the parallax expansion amount is decided by the image processor 28 deciding on the expansion amount coefficient k according to the input parallax. The expansion amount here is an expansion amount that increases according to the decrease in the input parallax. Namely, the expansion amount coefficient k increases as the input parallax decreases. However, the expansion amount coefficient k is one that decreases the parallax on approaching the perfect focus (in-focus position). Even if the parallax is expanded, the parallax is expanded within a range enabling good visual checkability by decreasing the parallax on approaching the perfect focus.

Although an explanation has been given of correcting the expansion amount coefficient k using the F number employed in still image capture, there is no limitation thereto; and the expansion amount coefficient k may be corrected using an F number equivalent to the maximum aperture value. In such cases, a ratio is computed of the $\rho(F)$ designated by the F number corresponding to the maximum aperture value with respect to the $\rho(F)$ designated by the F number currently set as the F number to be employed in live-view image capture, and the computed ratio may then be multiplied by the expansion amount coefficient k of the input-output function G.

At step 410F, determination is made by the image processor 28 as to whether or not EVF viewing condition has been satisfied. The EVF viewing condition is, for example, a condition indicating that the user is currently using the EVF 248. Determination as to whether or not the user is using the EVF 248 may, for example, be performed by determining whether or not it has been determined that the finder eyepiece 242 is being used based on the detection result of the eyepiece detection section 37. Namely, determination is that the user is using the EVF 248 when determined that the finder eyepiece 242 is being used, and determination is that the user is not using the EVF 248 when determined that the finder eyepiece 242 is not being used. Negative determination is made at step 410F in cases in which the EVF viewing condition is not satisfied, and the function deciding processing is ended. Affirmative determination is made at step 410F in cases in which the EVF viewing condition is satisfied, and processing transitions to step 410G.

At step 410G the function deciding processing is ended after the input-output function G acquired at step 410B or the input-output function G corrected at step 410E has been corrected by the image processor 28 to the EVF-use input-output function G. The EVF-use input-output function G indicates, for example, an input-output function G having a slope of the expansion amount coefficient k corresponding to the displacement amount computed based on the number of pixels in the parallax generation direction on the display screen of the EVF 248. The expansion amount coefficient k of the input-output function G corrected at step 410G is an example of an in-use expansion amount according to the present invention.

Figure 23:
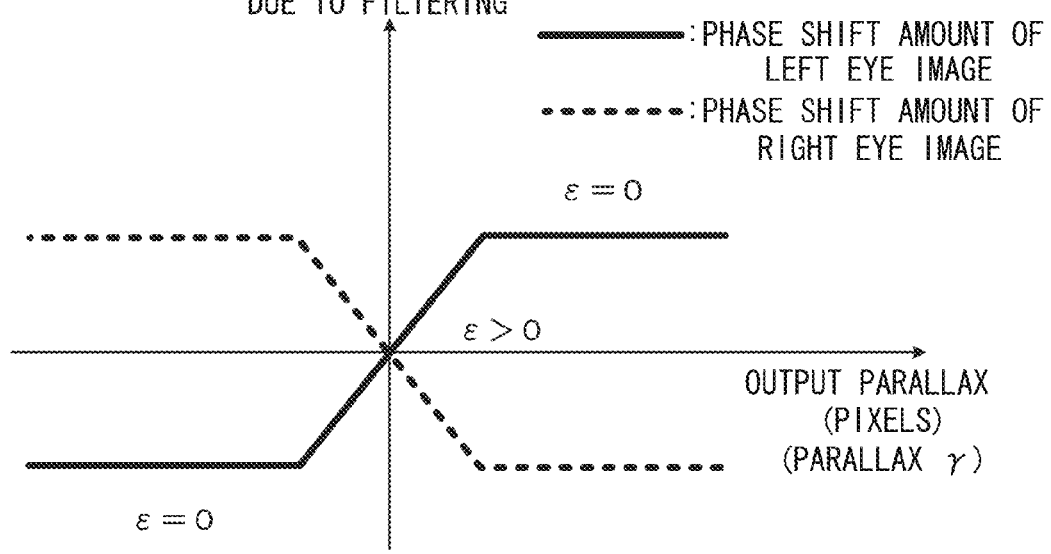
FIG. 23 is a graph illustrating an example of a relationship between output parallax derived using an input-output function and phase shift amount according to the first exemplary embodiment.

Returning to FIG. 19, at step 412 a filter coefficient is decided by the image processor 28 corresponding to the output parallax derived using the input-output function G decided on at step 410. The image processor 28 first derives a parallax γ equivalent to the output parallax using the input-output function G decided on at step 410. Namely, the parallax computed at step 408 as the input parallax is converted using the input-output function G decided on at step 410 into the parallax γ as the output parallax. A phase shift amount μ (in pixels) corresponding to the parallax γ is then derived. The phase shift amount μ may be uniquely determined by a function such as the example illustrated in FIG. 23 (the graph of the solid line or the broken line). The solid line graph illustrated in FIG. 23 illustrates the phase shift amount μ for the left eye image, with parallax γ for an imaging subject further away than an in-focus imaging subject (parallax 0) having a plus sign, and parallax γ for an imaging subject nearer than the in-focus imaging subject having a minus sign. A phase shift amount μ to the right is plus, and a phase shift amount μ to the left is minus. As illustrated in the broken line graph in FIG. 23, the phase shift amount μ for the right eye image takes the opposite sign to the phase shift amount μ for the left eye image.

In the example illustrated in FIG. 23, conversion is performed to the phase shift amount μ, such that the sign of the output parallax (in pixels) decided by the input-output function G does not change, by multiplying a slope ε (>0) by the parallax γ in a specific pixel number range (for example ±P1). For parallax γ exceeding the specific pixel number range, the phase shift amount μ is constant such that the slope ε is "ε=0", on the assumption that a miscalculation occurred in the parallax measurement results.

Figure 16B:
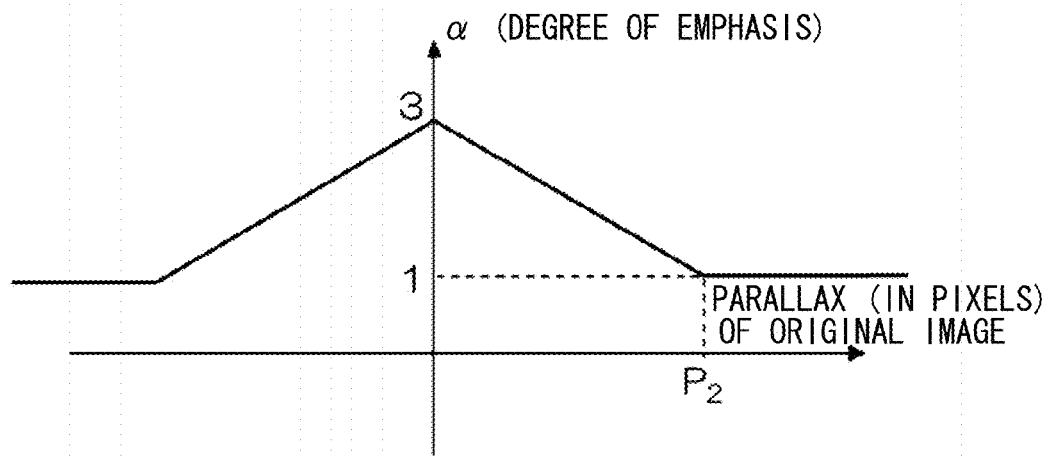
FIG. 16B is a graph schematically illustrating degree of edge emphasis.

Then the image processor 28 computes the filter coefficient of the filters $F_L$, $F_R$ according to [Equation 1] based on the phase shift amount μ computed according to the function illustrated as an example in FIG. 23, a preset standard deviation σ, and the edge emphasis strength a (see FIG. 16A and FIG. 16B). In the first exemplary embodiment an example is given in which the filter coefficients of the filters $F_L$, $F_R$ are computed using the [Equation 1]; however the present invention is not limited thereto. For example, a look up table (LUT) pre-stored with sets of filter coefficients associated with output parallaxes, phase shift amounts, or the like, may be prepared, and the filters $F_L$, $F_R$ decided by reading out the corresponding set of filter coefficients based on the output parallaxes or the like.

At step 414, image processing (processing to expand the parallax) is performed by the image processor 28 on the pixel group extracted at step 406 and the corresponding pixel group (for example, the pixel group extracted with reference to the corresponding point of the right eye image corresponding to the pixel of interest (i, j) set at step 404).

At step 414, for example, the image processor 28 first computes the pixel value of the pixel of interest (i, j) by performing filter processing using the filter $F_L$ of kernel size the same as the block size for the pixel group (block) extracted at step 406. It then computes the pixel value of the corresponding point of the right eye image by performing filter processing using the filter $F_R$ of kernel size the same as the block size for the pixel group extracted with reference to the corresponding point of the right eye image corresponding to the pixel of interest (i, j) set at step 404.

The image processor 28 then disposes (maps) the pixel value of the pixel of interest (i, j) of the left eye image and the pixel value of the corresponding point pixel in the right eye image that have been filter-processed in the above manner so as to be displaced by phase shift amount μ from their original positions.

If the block size (Cx×Cy) here is, for example, 7×7 pixels, then the kernel size of the filters $F_L$, $F_R$ is also 7×7 pixels, such as in the example illustrated in FIG. 24A and FIG. 24B. Then, filter processing is performed with the $F_L$, $F_R$ without releasing the left eye image pixel group (block) and the right eye image pixel group (block) for which the corresponding points where detected and the parallax γ was computed using the block matching method. This thereby enables a reduction to be made in the amount of memory employed, and processing can also be speeded up.

At the next step 416, an image is stored by the image processor 28 storing pixel values obtained for each pixel by the image processing performed at step 414 in a specific storage region (for example the memory 26), and then processing transitions to step 418.

At step 418, determination is made by the image processor 28 as to whether or not the filter processing has been completed for all pixels of the left eye image. Affirmative determination is made at step 418 if the filter processing has been completed for all pixels in the left eye image, and processing transitions to step 420. Negative determination is made at step 418 if filter processing has not been completed for all pixels in the left eye image, and processing transitions to step 404.

At step 420, after the image stored in the specific storage region by steps 400, 416 has been output by the image processor 28 to a specific output destination, the present image processing is ended. As the "specific output destination", an example is the display controller 36, and, in cases in which output to an external device is instructed by a photographer or the like through the operation section 14, the "specific output destination" may be the external I/F 39.

Figure 25:
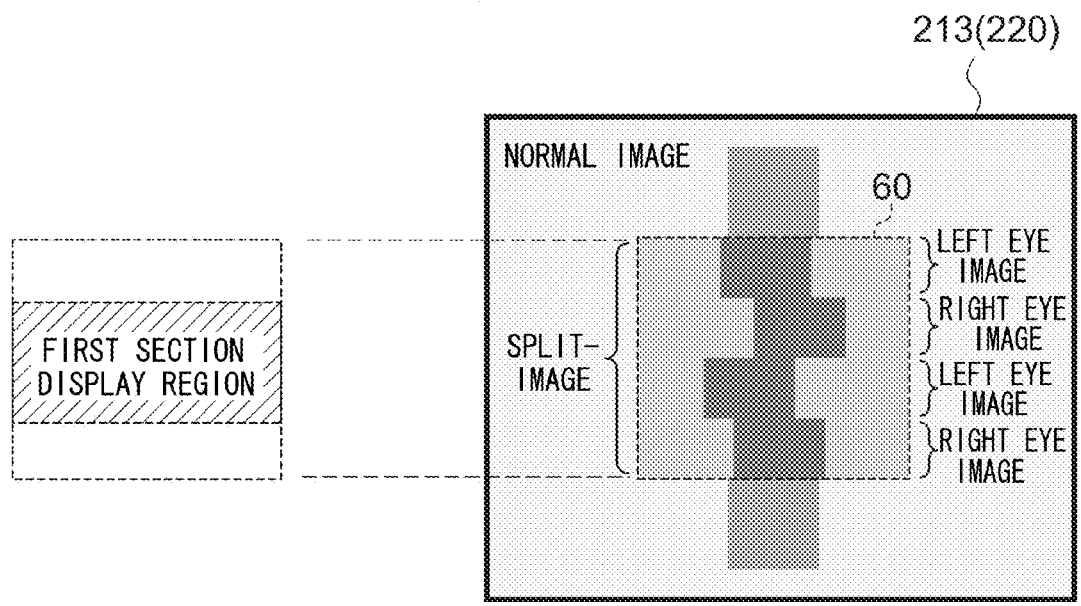
FIG. 25 is a schematic diagram illustrating an example of a split-image display when image output processing according to the first exemplary embodiment is performed, and is an example of split-image display for a case in which the displacement amount between the left eye image and the right eye image has been expanded corresponding to the first section display region.

When the image output processing illustrated in FIG. 19 has been performed by the image processor 28, a live view image, such as the example in FIG. 25, is displayed on the display section 213 and the HYBRID FINDER 220. In the example illustrated in FIG. 25, a split-image is displayed at the center of the screen in a region inside a frame 60, and a normal image is displayed in the region outside the frame 60.

Namely, the first and second pixel groups are set according to the size of the frame 60. The split-image is broadly divided into a left eye image (parallax image) corresponding to the first image output from the first pixel group, and a right eye image (parallax image) corresponding to the second image output from the second pixel group.

In cases in which the imaging subject corresponding to the image in the frame 60 is not in focus in the imaging lenses 16, the image is displaced in the parallax generation direction (for example the horizontal direction) at a boundary between the right eye image and the left eye image of the split-image, as illustrated in FIG. 25. The image at the boundary between the normal image and the split-image is also displaced in the parallax generation direction. This shows that phase difference is occurring, and a photographer is able to visually discern that phase difference has occurred, and able to visually discern the parallax generation direction, using the split-image.

However, in cases in which the imaging subject corresponding to the image in the frame 60 is in focus in the imaging lenses 16, the image is aligned at the boundary between the right eye image and the left eye image in the split-image. The image is also aligned at the boundary between the normal image and the split-image. This shows that phase difference has not occurred, and a photographer is able to visually discern that phase difference has not occurred, using the split-image.

The photographer is thereby able to visually check the focus state of the imaging lenses 16 with the split-image displayed on the display section 213. Moreover, in the manual focus mode, the focusing ring 302 of the imaging lenses 16 can be moved manually such that the misalignment from focus (the defocus amount) becomes zero.

In the imaging device 100 according to the first exemplary embodiment, a pixel included in the image at a position corresponding to the position of the first section display region in the split-image designated by the region designation processing at step 404 is set as the target for the pixel of interest. Thus the image processing of step 414 is performed on the left eye image and the right eye image at the position corresponding to the position in the first section display region as illustrated in the example in FIG. 25. As in the example in FIG. 25, the displacement amount between the right eye image and the left eye image corresponding to the position of the first section display region is accordingly expanded compared to other right eye image and left eye image displacement amounts. Image processing is performed on the image at the position corresponding to the position of the first section display region, and so processing load can be reduced compared to cases in which image processing is performed to all the pixels included in the right eye image and the left eye image corresponding to the positions in the entire display region of the split-image.

When the second section display regions have been designated in the region designation processing, the image processing of step 414 is then performed on the left eye image and the right eye image at the positions corresponding to the positions of the second section display regions. The displacement amount between the right eye image and the left eye image corresponding to the positions of the second section display regions (the displacement amount between the left eye image adjacent to the upper edge portion of the frame 60 and the right eye image adjacent to the lower edge portion of the frame 60 as illustrated in FIG. 25) is expanded compared to other right eye image and left eye image displacement amounts.

Figure 26:
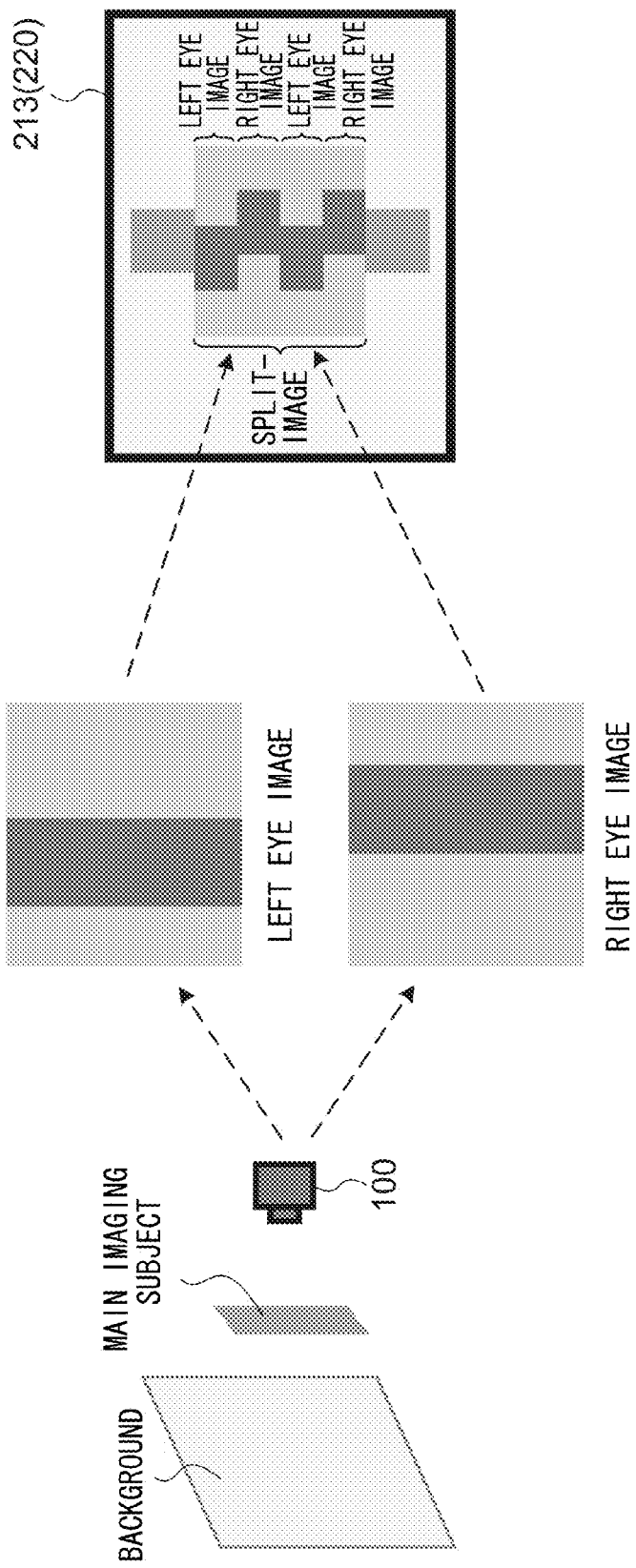
FIG. 26 is a schematic diagram illustrating an example of a split-image display when image output processing according to the first exemplary embodiment is performed, and is an example of split-image display for a case in which the displacement amount between the left eye image and the right eye image has been expanded corresponding to entire display region of the split-image.

When neither the first section display region nor the second section display regions have been designated in the region designation processing (when the entire display region of the split-image has been designated), the image processing of step 414 is performed on the right eye image and left eye image in the entire display region of the split-image. In such cases, as illustrated in the example of FIG. 26, the displacement amount between the right eye image and left eye image is expanded for the entire right eye image and left eye image included in the entire display region of the split-image.

Moreover, although explanation has been given in the first exemplary embodiment of a case in which the display color of the split-image is achromatic, there is no limitation thereto; and chromatic color may be applied to the split-image. Examples of such cases include, for example, a split-image configured by images of the left eye image and the right eye image that have been respectively applied with colorations having different color characteristics to each other, and disposed alternately in a specific direction (for example a direction intersecting with the parallax generation direction). More specifically, one example thereof is a configuration as illustrated in FIG. 25 or FIG. 26 in which the display color of one out of the left eye image or the right eye image is made achromatic, and the display color of the other is made chromatic. In order to make the display color of the split-image chromatic, for example, adjustments may be made to the configuration ratio of the primary color components (for example R, G, B) employed to set the white balance.

Figure 27:
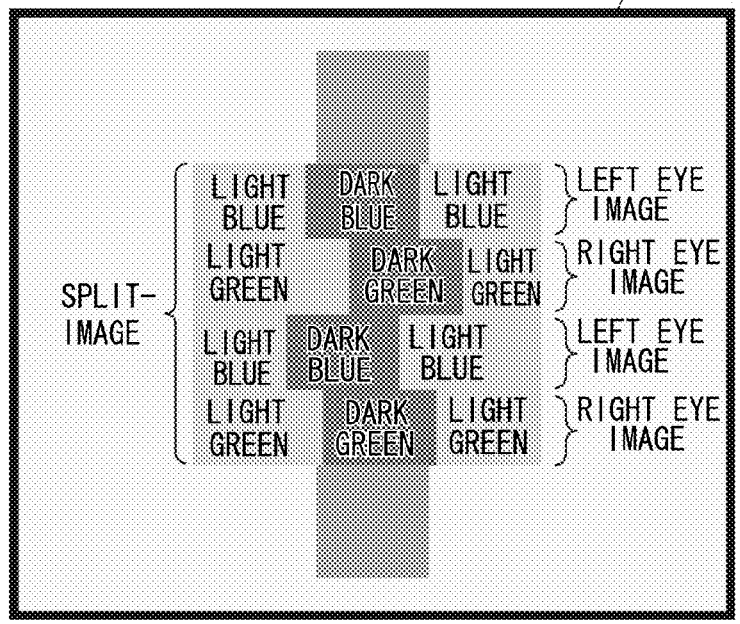
FIG. 27 is a schematic diagram illustrating an example of a split-image display when image output processing according to the first exemplary embodiment is performed, for a case in which coloration is applied to the split-image.

As illustrated in the example of FIG. 27, the whole of the split-image may be made chromatic. Preferably in such cases the color characteristics of the left eye image and the color characteristics of the right eye image are made different from each other. In the example illustrated in FIG. 27, a bluish coloration is applied to the left eye image, and a greenish coloration is applied to the right eye image.

Figure 28:
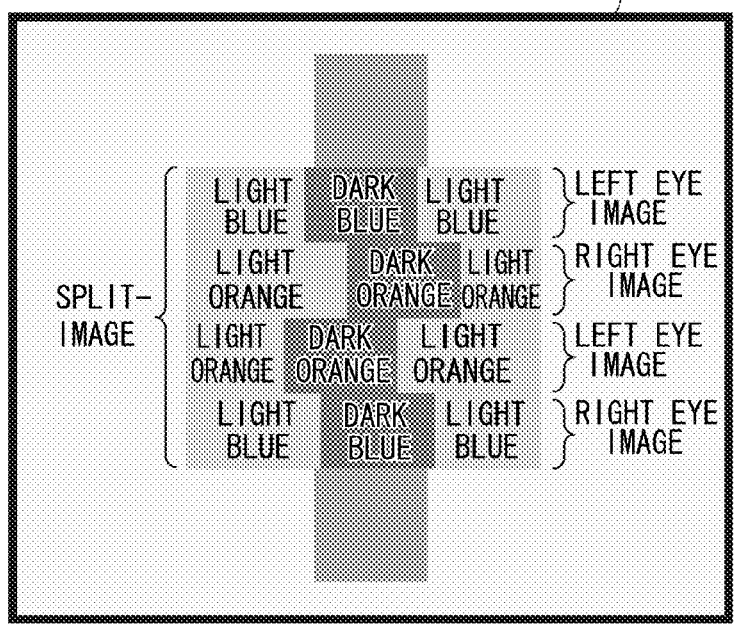
FIG. 28 is a schematic diagram illustrating an example of a split-image display when image output processing according to the first exemplary embodiment is performed, for a case in which coloration having color characteristics different from other parts of the left eye image and the right eye image is applied to the left eye image and the right eye image where the displacement amount is emphasized in the split-image.

Moreover, as illustrated in the example of FIG. 28, a coloration with different color characteristics to the other regions of the split-image may be applied to the left eye image and the right eye image (images in which the displacement amount has been expanded) at the positions corresponding to the position of the first section display region. In the example illustrated in FIG. 28, an orangey coloration is applied to the left eye image and the right eye image at the positions corresponding to the position of the first section display region, and a bluish coloration is applied elsewhere in the left eye image and the right eye image.

As described above, the imaging device 100 according to the first exemplary embodiment includes the first and second pixel groups respectively formed with images from the pupil-divided light beam that has passed through the exit pupil of the imaging lenses 16 on the left side and the right side of the optical axis (an example of a subject image that has passed through a first region and a second region). The image processor 28 that is an example of an image acquisition section acquires the left eye image and the right eye image corresponding to the first and second images output from the first and second pixel groups (step 402). The image processor 28 that is also an example of a parallax computation section computes the input parallax indicating the displacement amount between each of the pixels of the left eye image and each of the pixels of the right eye image (step 408). The image processor 28 that is also an example of an expansion amount decision section decides on an input-output function G with an expansion amount coefficient k (for example the slope of a linear function) for each of the target pixels in the left eye image and the right eye image (step 410). The image processor 28 that is also an example of a coefficient decision section decides on a filter coefficient, an example of a parallax conversion coefficient, with which to convert the input parallax to expanded parallax based on the decided input-output function G for each of the target pixels in the left eye image and the right eye image ( ). Moreover, the image processor 28 also performs processing to expand the parallax for the target pixels based on the decided filter coefficient (step 414). This thereby enables better visual checkability of displacement in the split-image corresponding to the parallax between the left eye image and the right eye image than in cases without such configuration.

In the imaging device 100 according to the first exemplary embodiment, an expansion amount coefficient that increases according to decrease in the computed input parallax is employed as the expansion amount coefficient k. This thereby enables even better visual checkability of displacement in the split-image corresponding to the parallax between the left eye image and the right eye image than in cases without such configuration.

Moreover, in the imaging device 100 according to the first exemplary embodiment, an expansion amount coefficient that has been determined according to at least one factor for generating displacement between the left eye image and the right eye image displayed in a specific display region is employed as the expansion amount coefficient k. This thereby enables even better visual checkability of displacement in the split-image corresponding to the parallax between the left eye image and the right eye image than in cases without such configuration.

In the imaging device 100 according to the first exemplary embodiment, the F number of the imaging lenses 16 is employed as one of the plural factors, and an expansion amount coefficient that increases as the F number gets higher is employed as the expansion amount coefficient k. This thereby enables suppression of a state in which the displacement in the split-image corresponding to parallax between the left eye image and the right eye image becomes more difficult to visually check as the aperture number gets larger than in cases without such configuration.

In the imaging device 100 according to the first exemplary embodiment, the image processor 28 decides on the expansion amount coefficient k based on the F number of the imaging lenses 16 and the maximum F number. This thereby enables an appropriate expansion amount coefficient k to be decided more simply than in cases without such configuration.

In the imaging device 100 according to the first exemplary embodiment, the F number to be employed during live-view image capture or the F number to be employed during still image capture is employed as the F number used to decide on the expansion amount coefficient k. This thereby enables an appropriate expansion amount coefficient k to be decided on more simply than in cases without such configuration.

In the imaging device 100 according to the first exemplary embodiment, plural factors for defining the displacement amount between the left eye image and the right eye image displayed on the display device are employed as the plural factors. This thereby enables, with a simple configuration, better visual checkability to be achieved of the displacement in the split-image corresponding to the parallax between the left eye image and the right eye image than in cases without such configuration.

In the imaging device 100 according to the first exemplary embodiment, the image processor 28 generates the normal image and the split-image. Then the display controller 36 performs control on the display device to display the normal image, and to display the split-image, including the image that has been filter-processed for the target pixels of image processing, inside the display region of the normal image. This thereby enables displacement corresponding to the parallax between images to be visually discerned more easily than in cases without such configuration.

In the imaging device 100 according to the first exemplary embodiment, the image pick-up device 20 includes the third pixel group, and the image processor 28 generates a normal image based on the third image output from the third pixel group. This thereby enables the quality of the normal image to be improved compared to cases not adopting the present configuration.

In the imaging device 100 according to the first exemplary embodiment, the pixels in the left eye image and the right eye image corresponding to the pixels included in the particular section image of the split-image are employed as the image processing target pixels. This thereby enables the load for image processing to be reduced compared to cases without such configuration.

In the imaging device 100 according to the first exemplary embodiment, the display controller 36 displays, on the display device, the left eye image and the right eye image including the particular section image on which image processing has been performed on the image processing target pixels (the processing to emphasize parallax). This thereby enables displacement in the split-image corresponding to the parallax between the left eye image and the right eye image to be visually discerned more easily than in cases without such configuration.

In the imaging device 100 according to the first exemplary embodiment, the image processor acquires the normal image based on the image output from the image pick-up device 20 (step 400). The display controller 36 displays on the display device the normal image, and displays, inside the display region of the normal image, the left eye image and the right eye image including the particular section image on which image processing has been performed on the image processing target pixels. This thereby enables displacement between the split-image and the normal image, and displacement in the split-image corresponding to the parallax between the left eye image and the right eye image to be visually discerned more easily than in cases without such configuration.

The imaging device 100 according to the first exemplary embodiment includes the operation section 14 as an example of a designation section that designates a section region in the display screen of the display device. Images at positions in the left eye image and the right eye image of the split-image corresponding to a position of a section region in the display screen designated through the operation section 14 are employed as the particular section image. This thereby enables the target pixels for image processing (processing to emphasize parallax) to be more easily designated than in cases without such configuration.

In the imaging device 100 according to the first exemplary embodiment, a part of the split-image corresponding to the image displaced along the parallax generation direction by a displacement amount according to the parallax between the left eye image and the right eye image is employed as the particular section image. This thereby enables displacement in the split-image corresponding to the parallax between the left eye image and the right eye image to be visually discerned more easily than in cases without such configuration.

In the imaging device 100 according to the first exemplary embodiment, an image is employed as the split-image in which the left eye image and the right eye image that have been respectively applied with colorations having different color characteristics to each other, are disposed alternately in a direction intersecting (for example orthogonal) to the parallax generation direction. This thereby enables the displacement in the split-image corresponding to the parallax between the left eye image and the right eye image to be visually discerned more easily than in cases without such configuration.

In the imaging device 100 according to the first exemplary embodiment, an image is employed as the particular section image applied with coloration having color characteristics different to other regions in the split-image. This thereby enables the image in the split-image that has been image processed based on the expansion amount coefficient k to be more easily identified visually from the other image therein than in cases without such configuration.

In the imaging device 100 according to the first exemplary embodiment, the image processor 28 decides on the filter coefficient based on the expansion amount coefficient k, and performs filter processing on the image processing target pixels using the filters $F_L$, $F_R$ employing the decided on filter coefficients. This thereby enables image processing based on the expansion amount coefficient k (processing to emphasize parallax) to be performed on the target pixels with a simpler configuration than cases without such configuration.

The imaging device 100 according to the first exemplary embodiment includes the eyepiece detection section 37 as an example of a detection section that detects use of the EVF 248. The image processor 28 decides on the expansion amount coefficient k to be employed during use of the EVF 248 in cases in which use of the EVF 248 is detected by the eyepiece detection section 37. Moreover, in cases in which use of the EVF 248 has not been detected by the eyepiece detection section 37, the expansion amount coefficient k to be employed when the EVF 248 is not being used is decided on. This thereby enables more appropriate expansion amount coefficients k to be decided on for when the EVF 248 is being used and when not being used than in cases without such configuration.

In the imaging device 100 of the first exemplary embodiment, the image processor 28 decides on the expansion amount coefficient k to be employed when the display section 213 is being used in cases in which use of the EVF 248 is not detected by the eyepiece detection section 37 and the pixels that have been image processed are to be displayed on the display section 213. This thereby enables a more appropriate expansion amount coefficient k to be decided on in cases in which an image that has completed image processing (processing to emphasize parallax) is displayed on the display section 213 of pixel number in the parallax generation direction different to that of the EVF 248 than in cases without such configuration.

In the imaging device 100 according to the first exemplary embodiment, in cases in which use of the EVF 248 is detected by the eyepiece detection section 37, a larger value is employed for the expansion amount coefficient k than the expansion amount coefficient k to be employed when the display section 213 is used. This thereby enables better visual checkability of displacement in the split-image corresponding to the parallax between the left eye image and the right eye image in cases in which an image that has completed image processing (processing to emphasize parallax) is displayed on the EVF 248 than in cases without such configuration.

An explanation has been given in the first exemplary embodiment of computing the expansion amount coefficient k based on plural factors; however there is no limitation thereto, and the expansion amount coefficient k may be computed based on a single factor. Preferably the aperture number of the imaging lenses 16 (for example the F number of the imaging lenses 16) is employed as the single factor. Moreover, in cases in which an instruction has not been given during live-view image capture to capture a still image, the expansion amount coefficient k may be decided by the image processor 28 based on the F number used during live-view image capture and the F number used during still image capture. The expansion amount coefficient k may also be decided by the image processor 28 based on the F number and the maximum aperture number of the imaging lenses 16.

Moreover, in the first exemplary embodiment, the image processing is performed on the pixel of interest irrespective of the magnitude of the input parallax; however there is no limitation thereto. Configuration may be made such that image processing is performed on the pixel of interest outside a specific parallax range in which the input parallax satisfies a specific condition. In such cases, for example, the image processor 28 determines whether or not the pixel of interest is outside of the specific parallax range satisfying the specific condition. Reference here to a "specific parallax range . . . satisfying a specific condition" indicates, for example, a focus verifiable parallax range. A "focus verifiable parallax range" indicates, for example, a parallax range in which a person is able to visually confirm when the pixel of interest is in a focused state on a display screen of a display device (for example the display section 213). Namely, in the imaging system of the imaging device 100, in cases in which elements in the image pick-up device 20 corresponding to the pixel of interest are in the subject depth of field, the pixel of interest has a parallax that a person is capable of visually verifying to be in a focused state on the display screen of the display device. Conversely, in cases in which the elements in the image pick-up device 20 corresponding to the pixel of interest in the imaging system of the imaging device 100 are not in the subject depth of field, then the pixel of interest has a parallax that a person is capable of visually verifying to be in a non-focused state on the display screen of the display device. In cases in which determination has been made by the image processor 28 that each of the pixels of interest are outside the specific parallax range, then the expansion amount coefficient k is decided on in the manner explained in the first exemplary embodiment. The imaging device 100 is thereby able to better suppress deciding on an expansion amount coefficient k for pixels on which image processing (processing to emphasize parallax) does not need to be performed than in cases without such configuration.

In the first exemplary embodiment, the input-output function G is a linear function; however there is no limitation thereto and a non-linear function may be applied thereto.

In the first exemplary embodiment, explanation has been given of an embodiment in which the input parallax is converted into the output parallax by employing the input-output function G, however the input parallax may be converted into the output parallax by employing a LUT. In such cases, for example, the output parallax corresponding to the input parallax may be derived by pre-associating input parallaxes, expansion amount coefficients k of the input-output function G, and output parallaxes.

In the first exemplary embodiment described above, an example is given of an interchangeable lens digital camera without a reflex mirror, however there is no limitation thereto, and the present invention may be applied to an image capture device with integral lens.

In the first exemplary embodiment described above, an example is given of the imaging device 100 including the display section 213 and the EVF 248, however there is no limitation thereto, and either the display section 213 or the EVF 248 may be included.

In the first exemplary embodiment, an example has been given of a split-image multiply divided in the up-down direction, however there is no limitation thereto, and application may be made of an image multiply divided in the left-right direction or a diagonal direction as a split-image.

In the first exemplary embodiment described above, explanation has been given of an example of a mode in which a split-image is displayed, however there is no limitation thereto, and another focus-check image may be generated from a left eye image and a right eye image, and this focus-check image displayed. For example, the left eye image and the right eye image may be superimposed in a combined display, so as to display as a double image when not in focus and display as a clear image when in a focused state.

The flow of region designation processing (see FIG. 17), the flow of image output processing (see FIG. 19), and the flow of function deciding processing (see FIG. 21) explained in the first exemplary embodiment are merely examples thereof. It therefore goes without saying that unnecessary steps may be omitted, new steps may be added, and the processing sequence may be switched within a range not departing from the spirit thereof. Each processing in the region designation processing, each processing in the image output processing, and each processing in the function deciding processing may be implemented by a software configuration using a computer by executing a program, or may be implemented by a hardware configuration. Implementation may also be made using a combination of a hardware configuration and a software configuration.

Programs may be pre-stored in a specific storage region (for example the memory 26) in cases in which at least one out of the region designation processing, the image output processing, and the function deciding processing is implemented by a computer executing a program. Initial storage in the memory 26 is not always necessary. For example, a program may first be stored on a freely selectable "portable storage medium" such as a flexible disk, called a FD, a CD-ROM, a DVD disk, a magneto optical disk, or an IC card, employed connected to a computer. A computer may then acquire and execute the program from such a portable storage medium. Each program may also be stored in advance on another computer, server device, or the like connected to a computer through the internet, a Local Area Network (LAN), or the like, such that the computer acquires and executes such programs therefrom.

Second Exemplary Embodiment

In the first exemplary embodiment, an example is given of the imaging device 100, however modified examples of the imaging device 100 include mobile terminal devices such as, for example, mobile phones and smartphones including a camera function, personal digital assistants (PDAs), mobile gaming devices, or the like. Detailed explanation follows regarding an example of a smartphone, with reference to the drawings.

FIG. 30 is a perspective view illustrating an example of the external appearance of a smartphone 500. The smartphone 500 illustrated in FIG. 30 includes a flat plate shaped casing 502, and a display and input section 520 provided on one face of the casing 502 and integrating together a display panel 521 serving as a display section and an operation panel 522 serving as an input section. The casing 502 includes a speaker 531, a microphone 532, an operation section 540, and a camera section 541. Note that the configuration of the casing 502 is not limited thereto, and, for example, a configuration may be employed in which the display section and the input section are provided independently from each other, and a configuration including a folding structure or a sliding structure may also be employed.

FIG. 31 is a block diagram illustrating an example of a configuration of the smartphone 500 illustrated in FIG. 30. As illustrated in FIG. 31, main configuration elements of the smartphone 500 include a wireless communication section 510, the display and input section 520, a communication section 530, an operation section 540, a camera section 541, a storage section 550, and an external input-output section 560. Main configuration elements of the smartphone 500 also include a Global Positioning System (GPS) receiver section 570, a motion sensor 580, a power supply section 590, and a main controller 501. Main functions of the smartphone 500 include a wireless communication function that performs mobile wireless communication through a base station device BS and a mobile communication network NW.

The wireless communication section 510 performs wireless communication with the base station device BS installed in the mobile communication network NW according to instructions from the main controller 501. Transmission and reception of various types of file data, such as voice data and image data, email data etc., and reception of web data, streaming data, and the like is performed using the wireless communication.

The display and input section 520 is what is referred to as a touch panel, and includes the display panel 521 and the operation panel 522. Thus, according to control by the main controller 501, the display and input section 520 transmits information to a user visibly by displaying images (still images and video images), text data, and the like, and also detects user operation on the displayed information. The display panel 521 is preferably a 3D display panel in cases in which generated 3D is viewed.

The display panel 521 employs a display device such as an LCD, or an organic electro-luminescence display (OELD). The operation panel 522 is a device that is installed such that an image displayed on the display screen of the display panel 521 is visible, and detects one or plural coordinates operated by a user finger or stylus. A detection signal generated by operation when such a device is operated by a user finger or stylus is output to the main controller 501. The main controller 501 then detects the operation position (coordinates) on the display panel 521 based on the detection signal received.

As illustrated in FIG. 30, the display panel 521 and the operation panel 522 of the smartphone 500 are integrated together to configure the display and input section 520, and the operation panel 522 is disposed so as to entirely cover the display panel 521. In cases in which such a placement is adopted, the operation panel 522 may include a function to detect user operation even in a region outside of the display panel 521. In other words, the operation panel 522 may include a detection region for a superimposed section superimposed on the display panel 521 (referred to below as the display region), and a detection region for an outer edge section other than the above that is not superimposed on the display panel 521 (referred to below as the non-display region).

The size of the display region and the size of the display panel 521 may completely match each other, however they do not necessarily have to match each other. The operation panel 522 may include two sensitive regions, at an outer edge portion and at an inside portion other than the outer edge portion. The width of the outer edge section is appropriately designed according to the size of the casing 502 and the like. Moreover, as a position detection method employed in the operation panel 522, any of, for example, a matrix switch method, a resistance film method, a surface acoustic wave method, an infrared radiation method, an electromagnetic induction method, an electrostatic capacitance method, or the like may be adopted.

The communication section 530 includes the speaker 531 and the microphone 532. The communication section 530 converts user voice input through the microphone 532 into voice data capable of being processed by the main controller 501, then outputs this to the main controller 501. The communication section 530 decodes voice data received by the wireless communication section 510 or by the external input-output section 560, and outputs the voice data from the speaker 531. As illustrated in FIG. 30, for example, the speaker 531 may be installed in the same face as the face at which the display and input section 520 is provided, and the microphone 532 may be installed in a side face of the casing 502.

The operation section 540 is a hardware key that employs a key switch or the like, and is a section that receives instructions from a user. For example, as illustrated in FIG. 30, the operation section 540 is installed to a side face of the casing 502 of the smartphone 500, and is a push-button type switch that is switched ON by depressing with a finger or the like, and is switched to an OFF state when the finger is removed by restoring force, such as from a spring.

The storage section 550 is stored with a control program and control data for the main controller 501, application software, address data that corresponds names against telephone numbers of communication partners, and data of sent and received emails. The storage section 550 stores web data downloaded by web browsing, and downloaded content data. The storage section 550 also temporarily stores streaming data and the like. The storage section 550 includes an internal storage section 551 installed within the smartphone, and an external storage section 552 including a detachable-memory external slot. The internal storage section 551 and the external storage section 552 configuring the storage section 550 are implemented using a storage medium, such as a flash memory type or a hard disk type. Other examples that may be employed as the storage medium include a multimedia card micro type, a card type memory (such as a MICRO SD (registered trademark) memory or the like), Random Access Memory (RAM), or Read Only Memory (ROM).

The external input-output section 560 serves the role of an interface to all external devices coupled to the smartphone 500, and is employed for communication and the like with other external devices, or for direct or indirect connection by a network. Examples of communication or the like with other external devices include, for example, a universal serial bus (USB), IEEE1394, or the like. Examples of networks include, for example, the internet, wireless LAN, BLUETOOTH (registered trademark), radio frequency identification (RFID), and infrared data association (IrDA: registered trademark) communication. Other examples of networks include ULTRA WIDEBAND (UWB: registered trademark), and ZIGBEE (registered trademark).

External devices coupled to the smartphone 500 include, for example, wired/wireless headsets, wired/wireless external chargers, a wired/wireless data port, and/or a memory card connected through a card socket. Other examples of external devices include a subscriber identity module (SIM) card, a user identity module (UIM) card, and an external audio/video device connected through an audio/video input/output (I/O) terminal. Examples of other external audio/video devices include wirelessly connected external audio/video devices. In place of an external audio/video device, for example, a wired/wirelessly connected smartphone, a wired/wirelessly connected personal computer, a wired/wirelessly connected PDA, a wired/wirelessly connected personal computer, or earphones or the like may also be applied.

The external input-output section is capable of transmitting received data that was transmitted by such external devices to each of the configuration elements within the smartphone 500, and capable of transmitting data within the smartphone 500 to the external devices.

Under instruction from the main controller 501, the GPS receiver section 570 receives GPS signals transmitted from GPS satellites ST1 to STn and executes position computation processing based on plural received GPS signals to detect the position in latitude, longitude, and altitude of the smartphone 500. The GPS receiver section 570 is also capable of detecting the position by using positional data when it is possible to acquire positional data from the wireless communication section 510 and the external input-output section 560 (such as a wireless LAN).

The motion sensor 580 includes, for example, a triaxial acceleration sensor, and detects physical movement of the smartphone 500 according to instruction from the main controller 501. The movement direction and acceleration of the smartphone 500 is detected by detecting the physical movement of the smartphone 500. The detection result is output to the main controller 501.

The power supply section 590 supplies electrical power accumulated in a battery (not illustrated in the drawings) to each of the sections of the smartphone 500 under instruction from the main controller 501.

The main controller 501 includes a microprocessor, and operates according to the control program and control data stored in the storage section 550 so as to integrally control each of the sections of the smartphone 500. In order to perform voice communication and data communication through the wireless communication section 510, the main controller 501 includes a mobile communication control function that controls each of the sections of the communication system, and an application processing function.

The application processing function is implemented by the main controller 501 operating according to application software stored in the storage section 550. Examples of application processing functions include an infrared communication function that controls the external input-output section 560 to perform data communication with a counter-party device, an email function that performs email transmission and reception, and a web browsing function that views web pages.

The main controller 501 includes an image processing function that displays a picture on the display and input section 520, or the like, based on image data (still image or video image data) such as received data or downloaded streaming data. The image processing function is a function in which the main controller 501 decodes the above image data, subjects the decoded result to image processing, and displays the image on the display and input section 520.

The main controller 501 also executes display control of the display panel 521, and operation detection control to detect user operation through the operation section 540, and the operation panel 522.

By executing display control the main controller 501 displays icons to startup application software, and software keys such as scroll bars, or displays windows to compose emails. Scroll bars are software keys to receive instructions to move the display portion of an image such as in large images that cannot be accommodated within the display region of the display panel 521.

By executing the operation detection control, the main controller 501 detects user operation through the operation section 540, and receives, through the operation panel 522, input of operations to the above icons, and input of character sequences to the entry field of the above window. By execution of the operation detection control, the main controller 501 receives scroll demands for display images through the scroll bar.

Moreover, by executing the operation detection control, the main controller 501 determines whether the operation position on the operation panel 522 is in the superimposed section that is superimposed on the display panel 521 (display region), or in the other outer edge section not superimposed on the display panel 521 (non-display region). It also includes a touch panel control function to receive the determination result, and to control the display position of the sensitive region of the operation panel 522 and the display position of the software key.

The main controller 501 detects gesture operations to the operation panel 522, and is capable of executing a preset function according to the detected gesture operation. Gesture operation does not mean a simple conventional touch operation, and means tracing a track with a finger or the like, specifying plural positions at the same time, and combinations thereof, and means an operation to trace a track of at least one of plural positions.

The camera section 541 is a digital camera that captures an image using an image pick-up device such as a CMOS or CCD, and includes functions similar to those of the imaging device 100 as illustrated in FIG. 1 and the like.

The camera section 541 is capable of switching between a manual focus mode and an automatic focus mode. When the manual focus mode has been selected, focusing of the imaging lens of the camera section 541 can be performed by operating a focus icon button or the like displayed on the operation section 540 or the display and input section 520. Then during manual focus mode, a live-view image combined with a split-image is displayed on the display panel 521, thereby enabling the focus state to be checked during manual focus. The HYBRID FINDER 220 illustrated in FIG. 7 may be provided to the smartphone 500.

The camera section 541, under control of the main controller 501, converts image data obtained by photography into, for example, compressed image data such as in joint photographic coding experts group (JPEG). Then the image data obtained by conversion can be stored in the storage section 550, and output through the input-output section 560 and the wireless communication section 510. In the smartphone 500 illustrated in FIG. 27, the camera section 541 is installed to the same face as the display and input section 520; however the installation position of the camera section 541 is not limited thereto, and installation may be made to the back face of the display and input section 520, or plural of the camera sections 541 may be installed. In cases in which plural of the camera sections 541 are installed, image capture may be performed independently by switching the camera section 541 for image capture, or image capture may be performed using plural of the camera sections 541 at the same time.

The camera section 541 may also be utilized by various functions of the smartphone 500. For example, images acquired with the camera section 541 may be displayed on the display panel 521, and an image of the camera section 541 may be utilized as an operation input to the operation panel 522. During position detection by the GPS receiver section 570, the position may be detected with reference to an image from the camera section 541. Moreover, the optical axis direction of the camera section 541 of the smartphone 500 may be determined and the present usage environment may be determined by reference to an image from the camera section 541, either without using the triaxial acceleration sensor, or in combination with using the triaxial acceleration sensor. Obviously the image from the camera section 541 may be utilized in application software.

It is also possible for various data to be added to the image data of still images or video images and stored in the storage section 550, and output through the input-output section 560 and the wireless communication section 510. Reference here to "various data" is, for example, to positional data acquired by the GPS receiver section 570 added to image data of still images or video images, and voice data acquired by the microphone 532 (which may be text data converted by speech to text conversion performed by the main controller or the like). It may moreover be orientation data or the like acquired by the motion sensor 580.

In each of the above exemplary embodiments, an example is given in which the image pick-up device 20 includes the first to third pixel groups, however the present invention is not limited thereto, and an image pick-up device configured from only a first pixel group and a second pixel group may be employed. A digital camera including such a type of image pick-up device is capable of generating a three dimensional image (3D image) based on the first image output from the first pixel group and the second image output from the second pixel group, and is also capable of generating a two dimensional image (2D image). In such cases, generation of the two dimensional image is, for example, performed by interpolation processing between pixels of the same color in each of the first image and the second image. The first image or the second image may also be employed as the two dimensional image without performing interpolation processing.

In each of the exemplary embodiments described above, examples have been explained in which the split-image is displayed within a display region of the normal image, however the present invention is not limited thereto, and the split-image (second display image) may be displayed on the display device without displaying the normal image (an example of the first display image). The split-image may also be displayed using the entire screen. An example that may be given of the "split-image" is cases in which an image pick-up device is employed configured from a phase difference pixels group alone (for example the first pixel group and the second pixel group), and cases in which an image pick-up device is employed with phase difference pixels (for example the first pixel group and the second pixel group) placed at a specific proportion with respect to the normal pixels and a split-image is based on images output from the phase difference pixel groups (for example the first image output from the first pixel group and the second image output from the second pixel group). Thus in the present invention, there is no limitation to a display mode that displays both the normal image and the split-image at the same time on the same screen of the display device, and the display controller 36 may perform control so as to control display of the split-image without displaying the normal image on the display device in cases in which an instruction to display the normal image is removed in a state in which display of the split-image is being instructed.

The invention claimed is:

1. An image processing device comprising:
   an image acquisition section that acquires a first image and a second image, based on a first image signal and a second image signal output respectively from a first pixel group and a second pixel group that output the first image signal and the second image signal and on which a subject image is formed after passing through a first region and a second region in an imaging lens so as to be pupil-divided;
   a parallax computation section that computes a parallax indicating a displacement amount between each pixel in the first image acquired by the image acquisition section and respective corresponding pixels in the second image acquired by the image acquisition section;
   an expansion amount decision section that, for each target pixel for image processing in the first image and second image acquired by the image acquisition section, determines an expansion amount of parallax according to the parallax computed by the parallax computation section;
   a coefficient decision section that, for each target pixel for image processing in the first image and the second image acquired by the image acquisition section, determines a parallax conversion coefficient for converting the parallax computed by the parallax computation section into expanded parallax based on the expansion amount decided by the expansion amount decision section;
   an image processing section that performs processing on the target pixels to expand parallax based on the parallax conversion coefficient determined by the coefficient decision section;
   a generation section that generates a first display image based on an image signal output from an image pick-up device including the first pixel group and the second pixel group, and generates a second display image for use in focus verification based on the first image and the second image;
   a display section that displays images; and
   a display controller that controls the display section so as to display the first display image, and to display in a display region of the first display image the second display image including an image in which processing to expand parallax has been performed on the target pixels.

2. The image processing device of claim 1, wherein the expansion amount that increases as the parallax computed by the parallax computation section decreases.

3. The image processing device of claim 1, wherein the expansion amount is determined according to at least one factor for generating displacement between the first display image displayed in a specific display region and the second display image displayed in the specific display region.

4. The image processing device of claim 3, wherein:
the at least one factor includes a factor of an aperture number of the imaging lens; and
the expansion increases as the aperture number gets larger.

5. The image processing device of claim 4, wherein the expansion amount decision section determines on the expansion amount based on the aperture number and a maximum aperture number.

6. The image processing device of claim 4, wherein the aperture number is an aperture number used during video image capture or an aperture number used during still image capture.

7. The image processing device of claim 3, wherein the at least one factor is a plurality of factors for defining the displacement amount between the first display image and the second display image displayed in the display region.

8. The image processing device of claim 1, wherein:
the image pick-up device includes a third pixel group on which a non-pupil-divided subject image is formed to output a third image signal; and
the generation section generates the first display image based on the third image signal output from the third pixel group.

9. The image processing device of claim 1, wherein the target pixels are pixels corresponding to pixels included in a particular section image in the second display image.

10. The image processing device according to claim 9, further comprising:
a designation section that designates a section region on a display screen of the display device, wherein
the particular section image is an image at a position in the second display image corresponding to a position of the section region designated by the designation section.

11. The image processing device of claim 10, wherein the particular section image is part of a split-image corresponding to an image in which the first display image and the second display image are displaced along a parallax generation direction by a displacement amount according to parallax.

12. The image processing device of claim 11, wherein the particular section image is an image applied with coloration having color characteristics different from other regions of a split-image.

13. The image processing device of claim 1, further comprising:
a determination section that determines whether or not the target pixel is outside a specific parallax range satisfying a specific condition, wherein
the expansion amount decision section decides the expansion amount for each of the target pixels determined by the determination section to be outside the specific parallax range.

14. The image processing device of claim 1, wherein:
the parallax conversion coefficient is a filter coefficient determined according to the expansion amount decision section; and the image processing section performs processing to expand parallax by performing filter processing on the target pixels with a filter using the filter coefficient.

15. An imaging device comprising:
the image processing device of claim 1; and
a storage section that stores images obtained by the image processing section performing the processing to expand parallax.

16. The imaging device of claim 15, further comprising:
an electronic viewfinder that displays images obtained by the image processing section performing processing to expand parallax; and
a detection section that detects use of the electronic viewfinder, wherein
the expansion amount decision section selects an in-use expansion amount predetermined as the expansion amount to be employed during use of the electronic viewfinder in cases in which use of the electronic viewfinder has been detected by the detection section, and selects a non-use expansion amount predetermined as the expansion amount to be employed during non-use of the electronic viewfinder in cases in which use of the electronic viewfinder has not been detected by the detection section.

17. The imaging device of claim 16, wherein, in cases in which use of the electronic viewfinder is not detected by the detection section and an image on which parallax expansion processing has been performed by the image processing section is to be displayed on an image display section with a number of pixels in a parallax generation direction different from the number of pixels in the parallax generation direction of the electronic viewfinder, the non-use expansion amount is set to a display section in-use expansion amount predetermined as the expansion amount to be employed during use of the image display section.

18. The imaging device of claim 17, wherein:
the number of pixels in the parallax generation direction of the image display section is more than the number of pixels in the parallax generation direction of the electronic viewfinder; and
the in-use expansion amount is set as a value larger than the display section in-use expansion amount in cases in which use of the electronic viewfinder is detected by the detection section.

19. A image processing method comprising:
an image acquisition process that acquires a first image and a second image, based on a first image signal and a second image signal output respectively from a first pixel group and a second pixel group that output the first image signal and the second image signal and on which a subject image is formed after passing through a first region and a second region in an imaging lens so as to be pupil-divided;
a parallax computation process that computes a parallax indicating a displacement amount between each pixel in the first image acquired by the image acquisition process and respective corresponding pixels in the second image acquired by the image acquisition process;
an expansion amount decision process that, for each target pixel for image processing in the first image and the second image acquired by the image acquisition process, determines an expansion amount of parallax according to the parallax computed by the parallax computation process;
a coefficient decision process that, for each target pixel for image processing in the first image and the second image acquired by the image acquisition process, determines a parallax conversion coefficient for converting the parallax computed by the parallax computation process into expanded parallax based on the expansion amount decided by the expansion amount decision process;

an image processing process that performs processing on the target pixels to expand parallax based on the parallax conversion coefficient determined by the coefficient decision process;

a generation process that generates a first display image based on the image signal output from an image pick-up device including the first pixel group and the second pixel group, and generates a second display image for use in focus verification based on the first image and the second image; and a display control process that controls so as to display the first display image on a display section that displays images, and to display, in a display region of the first display image, the second display image including an image in which processing to expand parallax has been performed on the target pixels.

20. A non-transitory computer-readable storage medium storing a program for causing a computer to function as:

the image acquisition section, the parallax computation section, the expansion amount decision section, the coefficient decision section, the image processing section, the generation section, and the display controller of the image processing device of claim 1.

* * * * *